(12) United States Patent
Mori

(10) Patent No.: US 6,417,930 B2
(45) Date of Patent: Jul. 9, 2002

(54) NETWORK FACSIMILE APPARATUS CAPABLE OF RELAYING E-MAIL TO FACSIMILE MACHINE

(75) Inventor: Yukikazu Mori, Ebina (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/040,696

(22) Filed: Mar. 18, 1998

(30) Foreign Application Priority Data

Mar. 19, 1997 (JP) .............................. 9-084633

(51) Int. Cl.⁷ .............................. G06F 13/00; H04N 1/00
(52) U.S. Cl. ...................... 358/1.15; 358/402; 358/407; 709/238
(58) Field of Search ............................ 358/1.15, 402, 358/403, 407, 434, 440, 442, 443, 468; 709/204, 206, 207, 238; 379/93.24, 100.01, 100.08, 100.09

(56) References Cited

U.S. PATENT DOCUMENTS

| 5,479,411 A | * | 12/1995 | Klein | 379/88.13 |
| 5,548,789 A | * | 8/1996 | Nakanura | 709/206 |
| 5,630,060 A | * | 5/1997 | Tang et al. | 709/238 |
| 5,812,278 A | * | 9/1998 | Toyoda et al. | 358/402 |
| 5,826,062 A | * | 10/1998 | Fake, Jr. et al. | 707/513 |
| 5,844,691 A | * | 12/1998 | Nishiyama et al. | 358/434 |
| 5,864,870 A | * | 1/1999 | Guck | 707/104 |
| 5,881,233 A | * | 3/1999 | Toyoda et al. | 709/233 |
| 5,928,325 A | * | 7/1999 | Shaughnessy et al. | 709/206 |
| 5,991,365 A | * | 11/1999 | Pizano et al. | 379/88.13 |
| 6,005,675 A | * | 12/1999 | Maeda et al. | 358/442 |

OTHER PUBLICATIONS

Patel et al., "The Multimedia Fax–MIME Gateway", IEEE Journal, pp. 64–70, 1994.*

* cited by examiner

Primary Examiner—Edward Coles
Assistant Examiner—Joseph R. Pokrzywa
(74) Attorney, Agent, or Firm—Cooper & Dunham LLP

(57) ABSTRACT

A network facsimile apparatus relaying electronic mail to a facsimile machine receives electronic mail via a local area network and the Internet and transmits facsimile data including facsimile image information and a facsimile data file through facsimile communications procedures via PSTN. The network facsimile apparatus analyzes the received E-mail to determine if it is relay transmission mail and if received relay transmission mail includes text contents, reads a telephone number of a destination facsimile machine from the received relay transmission mail, and converts the contents of the received electronic mail into facsimile image information when the received E-mail is a relay transmission mail and includes text contents and into a facsimile transfer data file when the. received E-mail is relay transmission mail and includes non-text contents and transmits one of the facsimile image information and the facsimile transfer data file to the destination facsimile machine having the telephone number read from the received relay transmission mall 18 Claims, 17 Drawing Sheets

FIG. 4

```
Date: Fri, 17 Jan 1997 11:45]21 +0900
Message-ID:<YYYYYYYYYYYY@***.co.jp>
From: userl@***.co.jp
To: NETFAX@***.co.jp (relay: 0123-4567-8901)
Subject: Report
Mime-Version: 1.0
Content-type: text/plain; charset="ISO-2022-JP"
Content-Transfer-Encoding: 7bit XXです。
先日は、お世話になり、ありがとうございました。
あのときに打合せた件については、順調に進行中です。
また、細かい点の---------------------------------
--------------------------------------------
--------------------------------------------
--------------------------------------------
以上
```

FIG. 5

```
Date: Fri, 17 Jan 1997 11:45]21 +0900
Message-ID:<YYYYYYYYYYYY@***.co.jp>
From: userl@***.co.jp
To: NETFAX@***.co.jp (relay: 0123-4567-8901)
Subject: Report
Mime-Version: 1.0
Content-type: application/octet-stream;
              name="bunsyo.doc"
Content-Transfer-Encoding: base64

0M8R4KGxGuEAAAAAAAAA0wADAP7//CQGAAA
AAAAAAAAAAAAAAAAAAAAAAAAweAAAAEAAAD
A+///////AAAAAAAEAAAD////////////////
/////////////////////////////
```

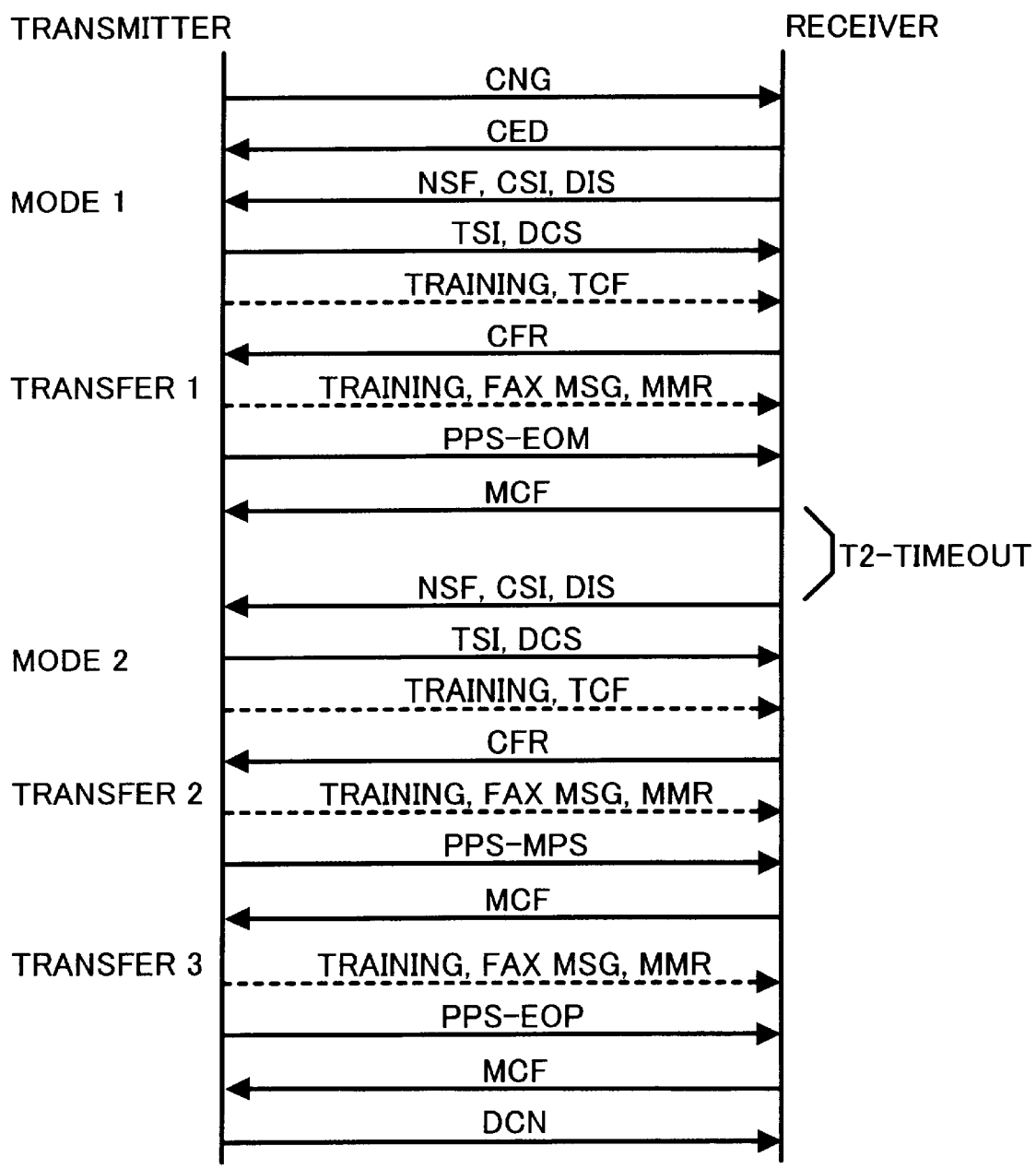

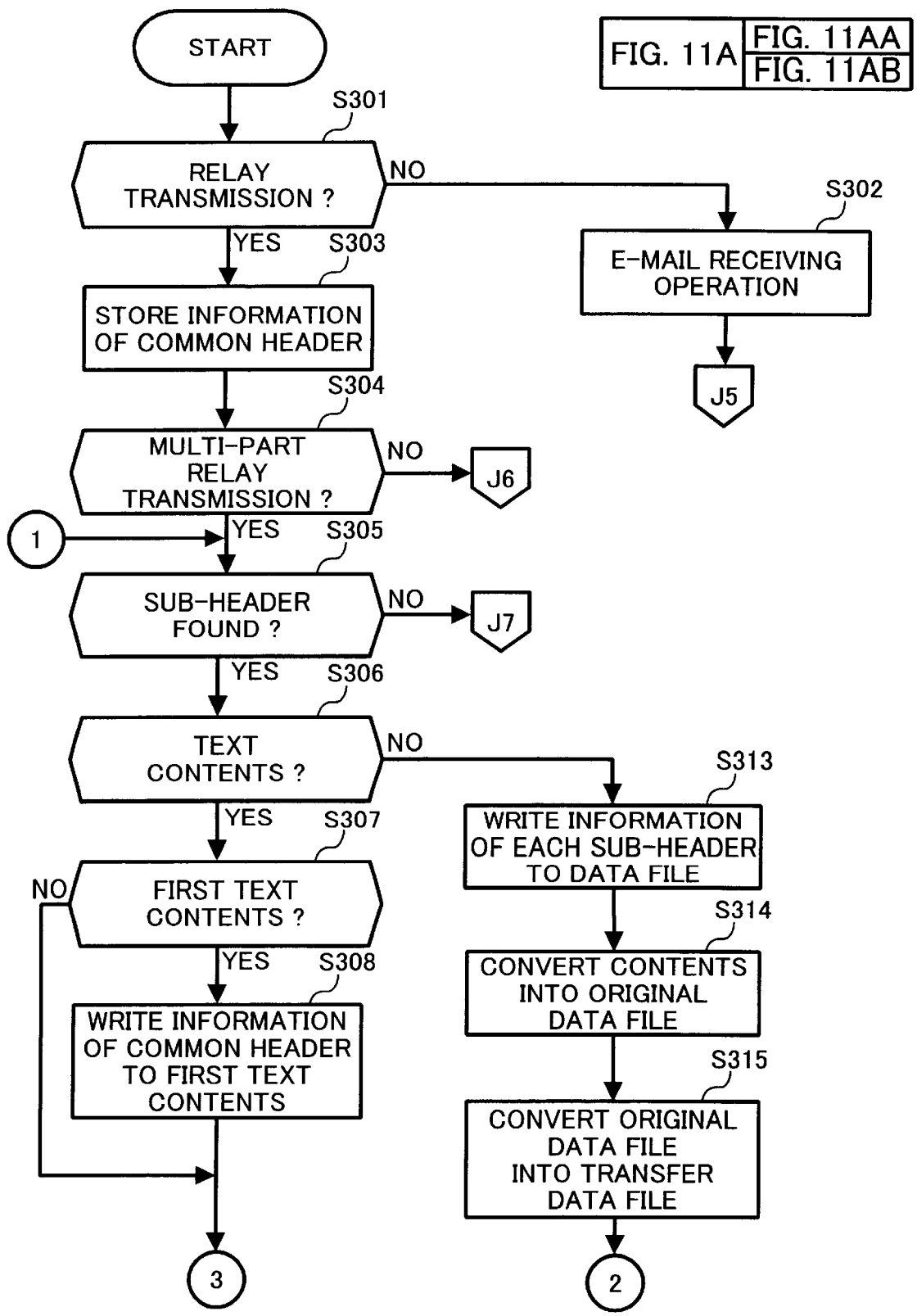

NETWORK FACSIMILE APPARATUS CAPABLE OF RELAYING E-MAIL TO FACSIMILE MACHINE

BACKGROUND

1. Field

The disclosed system and method relate to a network facsimile apparatus, and more particularly to a network facsimile apparatus which can relay electronic mail to a destination facsimile machine.

2. Discussion

Network facsimile machines have been developed which exchange E-mail (electronic mail) with other terminals via a local area network and the Internet and, in addition, exchange facsimile data with other facsimile machines via a public switched telephone network (PSTN) using facsimile communications procedures. Such network facsimile machines can relay facsimile image information to a destination facsimile machine in response to receiving, over a local area network of the Internet, E-mail that contains such facsimile image information and a telephone number for the destination facsimile machine. By using a local area network or the Internet for a part of the transmission path, a user can benefit from cost savings as compared with transmitting the same information directly to the destination facsimile machine using only conventional facsimile transmission through the PSTN.

E-mail as widely used in various communications systems, including local area networks and the Internet, can use multipurpose Internet mail extensions (MIME) format to convey not only a text message but also a data file that contains arbitrary data that may be text data and/or image data. However, a Group 3 facsimile machine uses a different format to transmit a data file that contains arbitrary data that can be text data and/or image data—it uses an error correction mode (ECM) protocol.

It is believed that there has not been a practical system in which a network facsimile machine can reliably relay to a destination facsimile machine, E-mail containing not only facsimile data which already is in the appropriate format for transmission between facsimile machines over but also arbitrary data that can include a text message as well as image data.

SUMMARY

The disclosed system and method provide a novel network facsimile machine and network facsimile method of relaying E-mail to a destination facsimile machine.

In a particular and non-limiting example of the disclosed system and method, a novel network facsimile machine includes an electronic mail receiver for receiving electronic mail via a local area network and the Internet, a facsimile transmitter for transmitting facsimile data including facsimile image information and a facsimile data file through facsimile communications procedures via PSTN, a mail analyzer for analyzing if received electronic mail is a relay transmission mail and if a received relay transmission mail includes text and for reading a telephone number of a destination facsimile machine from the received relay transmission mail, and a relay transmission controller for converting the received electronic mail into facsimile image information when the mail analyzer determines that the received electronic mail is a relay transmission mail and includes text and into a facsimile transfer data file when the mail analyzer determines that the received electronic mail is a relay transmission mail and includes non-text contents and for transmitting one of the facsimile image information and the facsimile transfer data file through the facsimile transmitter to the destination facsimile machine having the telephone number read by the mail analyzer from the received relay transmission mail.

In another non-limiting example of the disclosed system and method, a network facsimile machine includes an electronic mail receiver for receiving electronic mail via a local area network and the Internet, a facsimile transmitter for transmitting facsimile data including facsimile image information and a facsimile data file through facsimile communications procedures via a public switched telephone network, a mail analyzer for determining whether electronic mail received through the electronic mail receiver is a multi-part relay transmission mail and whether each part of a received multi-part relay transmission mail includes text and for reading a telephone number of a destination facsimile machine from the received relay transmission mail, and a relay transmission controller for converting each relevant part of the received electronic mail into facsimile image information when the mail analyzer determines that the received electronic mail is a multi-part relay transmission mail and includes at least one part which is text and into a facsimile transfer data file when the mail analyzer determines that the received electronic mail is a multi-part relay transmission mail and includes at least one non-text part and for transmitting all of the facsimile image information and all of the facsimile transfer data files in one transmission session through the facsimile transmitter to the destination facsimile machine having the telephone number read by the mail analyzer from the received relay transmission mail.

In a non-limiting example, a novel method of electronic mail relay transmission includes the steps of receiving electronic mail via a local area network and the Internet, transmitting facsimile data including facsimile image information and a facsimile data file through facsimile communications-procedures via a public switched telephone network, analyzing to determine whether electronic mail received through the electronic mail receiver is a relay transmission mail and whether a received relay transmission mail includes text, reading a telephone number of a destination facsimile machine from the received relay transmission mail, converting the received electronic mail into facsimile image information when the mail analyzer determines that the received electronic mail is a relay transmission mail and includes text and into a facsimile transfer data file when the mail analyzer determines that the received electronic mail is a relay transmission mail and includes non-text contents, and transmitting one of the facsimile image information and the facsimile transfer data file through the facsimile transmitter to the destination facsimile machine having the telephone number read by the mail analyzer from the received relay transmission mail.

In yet another non-limiting example, a novel method of electronic mail relay transmission includes the steps of receiving electronic mail via a local area network and the Internet, transmitting facsimile data including facsimile image information and a facsimile data file through facsimile communications procedures via a public switched telephone network, analyzing whether an electronic mail received through the electronic mail receiver is a multi-part relay transmission mail and whether each part of a received multi-part relay transmission mail includes text, reading a telephone number of a destination facsimile machine from the received relay transmission mail, converting the parts of the content of the received electronic mail into facsimile image information when the mail analyzer determines that the received electronic mail is a multi-part relay transmission mail and includes at least one text part and into a facsimile transfer data file when the mail analyzer determines that the received electronic mail is a multi-part relay transmission mail and includes at least one non-text part, and transmitting all of the facsimile image information and all of the facsimile transfer data files by one transmission time through the facsimile transmitter to the destination facsimile machine having the telephone number read by the mail analyzer from the received relay transmission mail.

Other features and advantages of the disclosed system and method will become apparent from the following detailed description when read in conjunction with the accompanying drawings.

This application is based on Japanese Patent Application No. JPAP09-084633 filed in the Japanese Patent Office on Mar. 19, 1997, the entire contents of which are hereby incorporated by reference.

BRIEF DESCRIPTION OF THE DRAWINGS

A more complete appreciation of the disclosed system and method and many of the attendant advantages thereof will be readily obtained as the same becomes better understood by reference to the following detailed description when considered in connection with the accompanying drawings, wherein:

FIGS. 4 and 5 are examples of relay transmission request E-mails to be transmitted to the network facsimile apparatus of FIG. 2;

FIGS. 8 and 9 are examples of procedures of the multi-part relay transmission operation performed by the network facsimile apparatus of FIG. 2;

DETAILED DESCRIPTION

Figure 1:
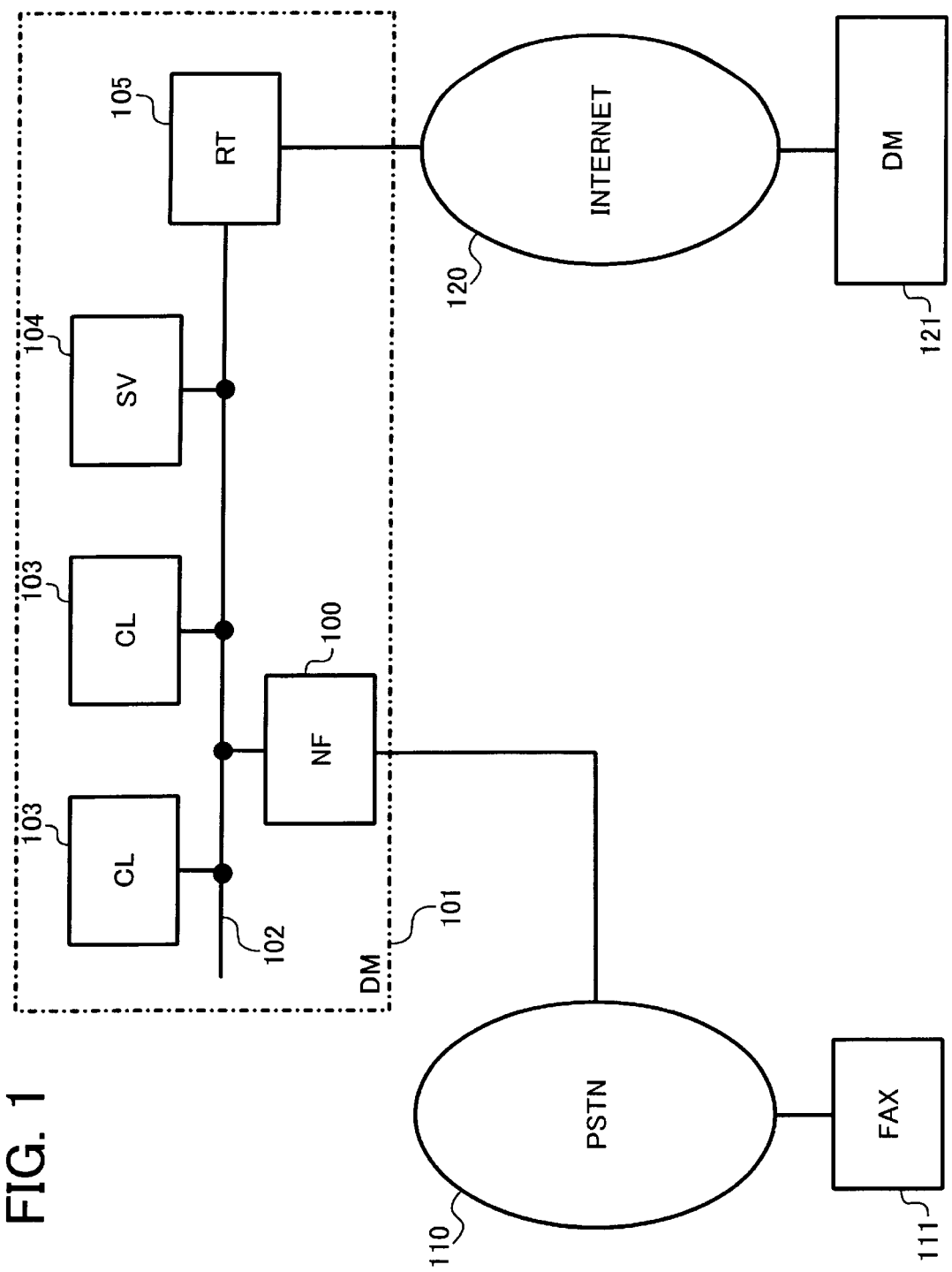
FIG. 1 is a block diagram of an electronic communications system including a novel network facsimile apparatus.

In describing preferred embodiments illustrated in the drawings, specific terminology is employed for the sake of clarity. However, the invention-is not intended to be limited to the specific terminology so selected and it is to be understood that each specific element includes all technical equivalents which operate in a similar manner.

Referring now to the drawings, wherein like reference numerals designate identical or corresponding parts throughout the several views, FIG. 1 illustrates an exemplary electronic communications system including a network facsimile apparatus (NF) 100. The electronic communications system of FIG. 1 includes various types of electronic communications networks such as a domain (DM) 101 that includes a local area network (LAN) 102, a public switched telephone network (PSTN) 110, the Internet 120, and possibly other network which are not specifically illustrated.

The LAN 102 connects various devices, including the above-mentioned network facsimile apparatus 100, a plurality of client terminals (CL) 103, a mail server (SV) 104, and a router (RT) 105, and allows communication among them. The PSTN 110 connects a plurality of communications terminals including a Group 3 facsimile machine FAX 111 to allow communications among these terminals. The Internet 120 connects a plurality of domains (DMs), including the DM 101 and a DM 121 that has a structure similar to that of the DM 101, and allows communications among the domains.

The network facsimile apparatus 100 is connected to the LAN 102 and the PSTN 110, and the RT 105 is connected to the LAN 102 and the Internet 120. Through these connections, the LAN 102 has a connection to the plurality of terminals including the FAX 111 and to the plurality of domains such as the DM 121.

The FAX 111 transmits and receives image information through a Group 3 facsimile communications procedure and transmits and receives an arbitrary data file under a Group 3 facsimile file transfer procedure and stores the received arbitrary data file into a memory, such as a floppy disk or the like, for example, using an arbitrary file system.

The DM 101 has a network address. Each of the CLs 103, the SV 104, and the network facsimile apparatus 100, which are connected to the DM 101, has an individual network address which is usually based on its individual address coupled with the network address of the DM 101. Such an individual network address is referred to as an individual host address. A user who uses a client terminal in the DM 101 is provided with an individual user address which is usually based on the user's name coupled with the above-mentioned individual host address of the client terminal.

The network facsimile apparatus 100 sends and receives electronic mail (E-mail) to and from other terminal machines through the LAN 102 using communications procedures which are explained later. The network facsimile apparatus 100 further has general facsimile capabilities including a Group 3 facsimile communications capability for transmitting and receiving facsimile image information and a Group 3 facsimile file transfer capability for transmitting and receiving a data file including arbitrary binary data including text and image information created under an arbitrary application, to and from destination facsimile machines through the PSTN 110.

Generally, a so-called protocol suite is applied for communications between machines connected to local area networks and via the Internet. In an operation of the protocol suite, a communication protocol, so-called TCP/IP (transmission control protocol/Internet protocol) and another communication protocol are used in combination for up to a transport layer of an OSI (open systems interconnection), and for the layers higher than the transport layer, respectively. For example, an SMTP (simple mail transfer protocol) is used as a higher layer protocol for communications such as E-mail.

The LAN 102 of FIG. 1 employs a mail server system, in which an incoming E-mail is first stored in the SV 104 and then sent to a destination client terminal. Specifically, when a destination address attached to the E-mail is the network address assigned to the DM 101, the mail server system stores the E-mail into the SV 104. When the E-mail has a destination address other than the one assigned to the DM 101, the mail server system transmits the E-mail to the Internet 120 via the RT 105, and the E-mail is sent to a domain or a host machine which has a network address corresponding to the destination address attached to the E-mail through a data transmission function of the Internet 120.

At a certain interval, each of the CLs 103 and the network facsimile apparatus 100 requests the SV 104 to check if the SV 104 is storing an incoming E-mail addressed to a user of the requesting machine. When an E-mail addressed to the user of the requesting machine is stored in the SV 104, the mail server system transmits the E-mail to the requesting machine. Upon receiving the E-mail., the requesting machine indicates to the user that there is an incoming E-mail. In the example being described, the network facsimile apparatus 100 has an E-mail address to exchange E-mail and uses it as a user address. The protocol is a POP (post office protocol), for example, to be applied for the communications from the CLs 103 and the network facsimile apparatus 100 to the SV 104 to request the incoming check as described above.

Each of the above-mentioned communication protocols, such as the TCP/IP, SMTP, and POP, as well as the data format and structure of the E-mail are defined in an RFC (request for comments) published by an IETF (Internet engineering task force). For example, the TCP and IP are defined in an RFC793, the SMTP in an RFC821, and the data format and structure of the E-mail in an RFC822, RFC1521, RFC1522, and RFC1468.

In this way, one of the preferred structures of an electronic communications system including the network facsimile apparatus 100 of the disclosed system is arranged.

Figure 2:
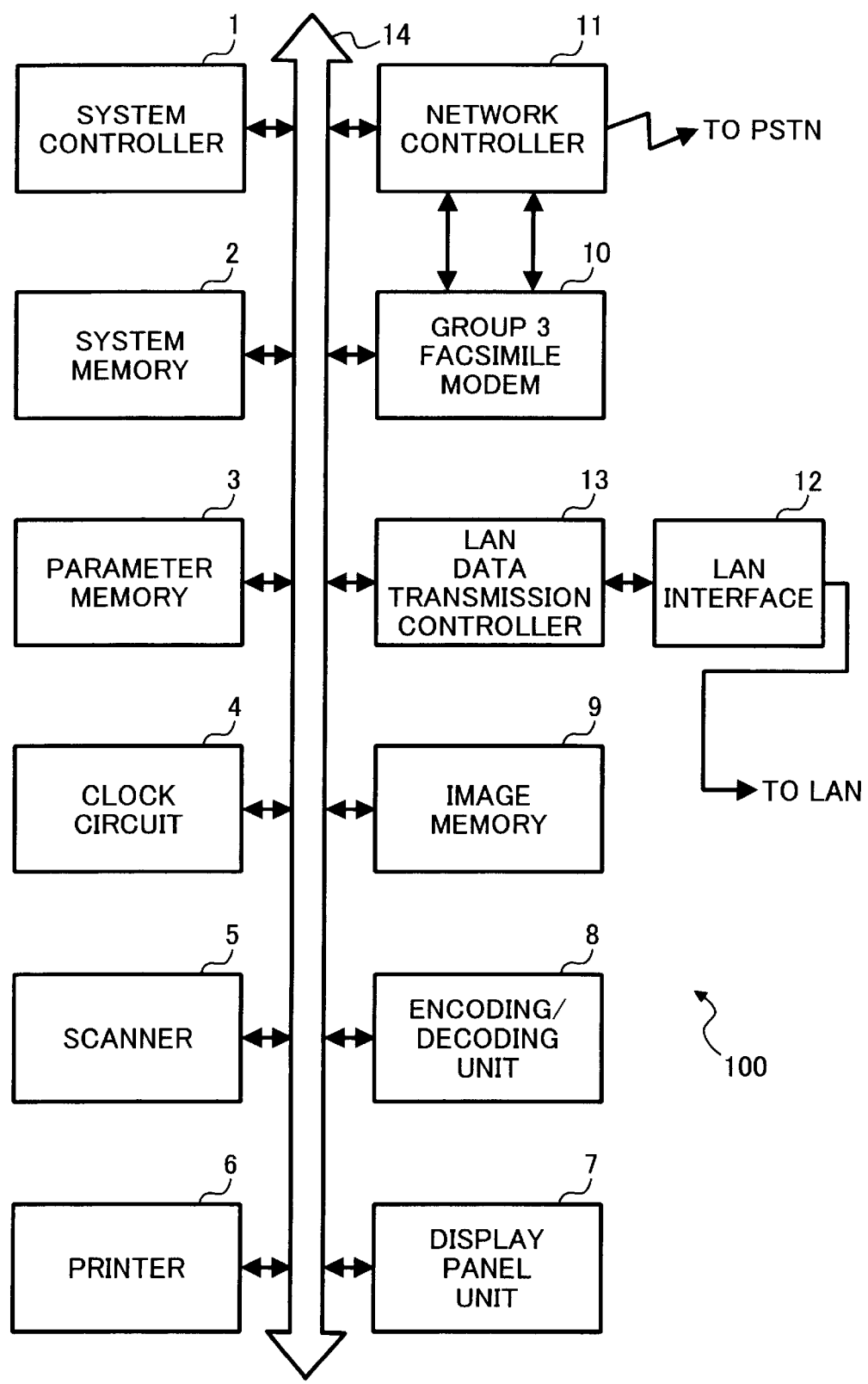
FIG. 2 is a block diagram of the network facsimile apparatus included in the electronic communications system of FIG. 1.

Next, an exemplary structure of the network facsimile apparatus 100 is explained with reference to FIG. 2. The network facsimile apparatus 100 includes a system controller 1, a system memory 2, a parameter memory 3, a clock circuit 4, a scanner 5, a printer 6, a display panel unit 7, an encoding/decoding unit 8, an image memory 9, a Group 3 facsimile modem 10, a network controller 11, a LAN (local area network) interface 12, a LAN (local area network) data transmission controller 13, and an internal bus 14.

The system controller 1 controls an entire system of the network facsimile apparatus 100 and, specifically, performs various kinds of controls, including a facsimile data transmission control for transmitting and receiving image information and an arbitrary data file. The system memory 2 stores control programs to be performed by the system controller 1 and various kinds of data necessary for the execution of the control programs. in addition the system memory 2 includes a working memory area reserved for use of the system controller 1. The parameter memory 3 stores various kinds of parameters and information specific to the network facsimile apparatus 100. The clock circuit 4 generates information of the present time.

The scanner 5 reads an image of document at a predetermined resolution. The printer 6 produces an image output at a predetermined resolution. The display panel unit 7 includes various kinds of operational keys and indicators facilitating the interfacing between an operator and the network facsimile apparatus 100.

The encoding/decoding unit 8 encodes an input image signal to compress information the image information and decodes the compressed information back into the input image signal. The transmission data memory 9 stores data including the compressed image data and data files to be transmitted.

The Group 3 facsimile modem 10 performs the functions of a modem for the Group 3 facsimile machine and includes a low-speed modem function, such as a V.21 modem, for transmitting and receiving communication protocols and a high-speed modem function, such as V.17, V.34, V.29, V.27 ter modems, for mainly transmitting and receiving image information. The network controller 11 includes an automatic transmitting and receiving function and controls the connection of the network facsimile apparatus 100 to the PSTN 110.

The LAN interface 12 interfaces the connection between the LAN data transmission controller 13 and the LAN 102 constructed in the DM 101. The LAN data transmission controller 13 controls communications, using a predetermined protocol suite, for exchanging various kinds of data with the machines of the DM 101 via the LAN 102 and other data terminal machines via the Internet 120 and the LAN 102.

The internal bus 14 is connected to all of the above-described units of the network facsimile apparatus 100, except for the LAN interface 12 which has a connection to the LAN data transmission controller 13, and allows the communications between these units therethrough. The network controller 11 has direct connections to the Group 3 facsimile modem 10.

In this way, one of the preferred structures of the network facsimile apparatus 100 is arranged.

Figure 3:
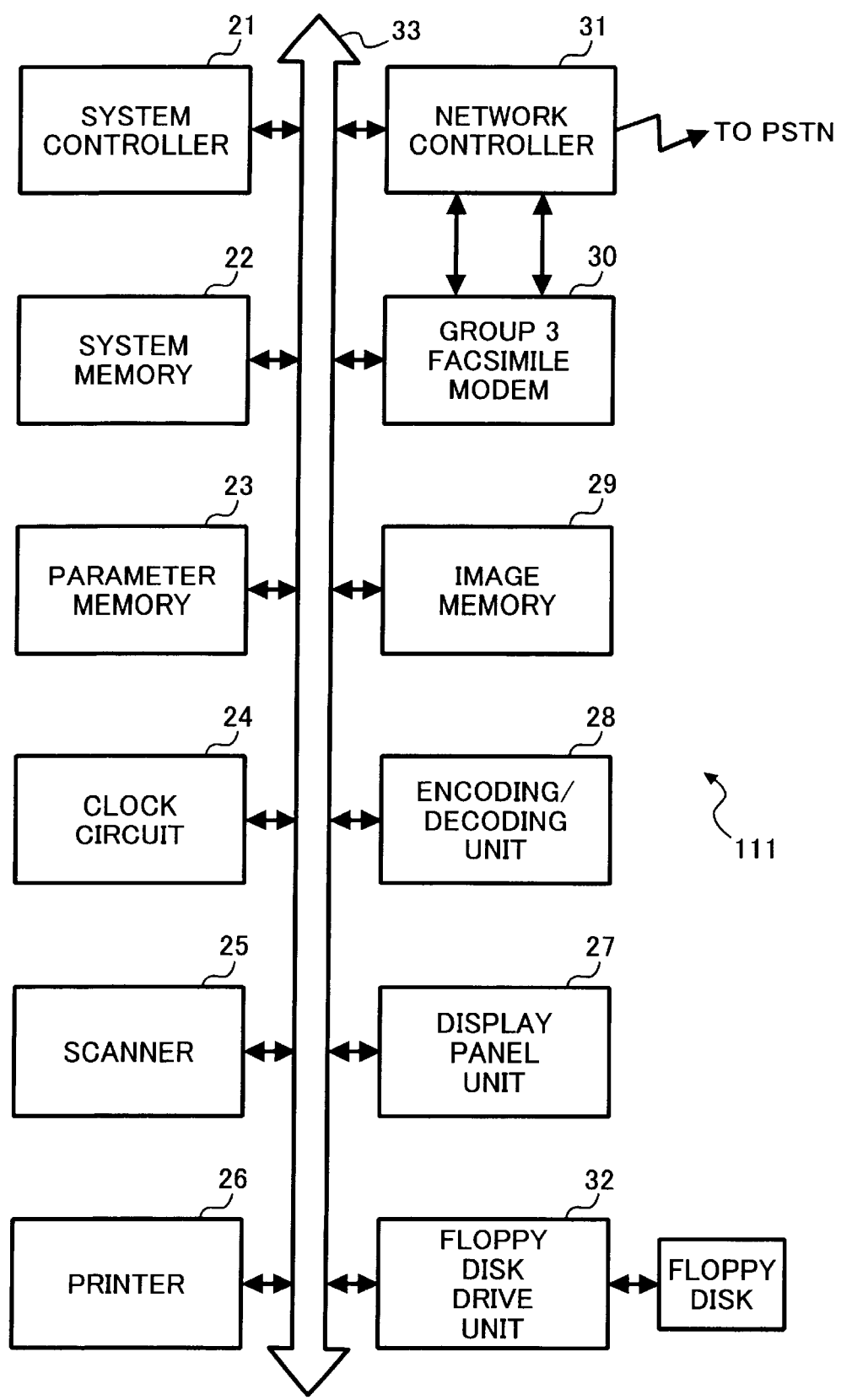
FIG. 3 is a block diagram of a destination Group 3 facsimile machine included in the electronic communications system of FIG. 1.

Next, an exemplary structure of the FAX 111 is explained with reference to FIG. 3. The FAX 111 includes a system controller 21, a system memory 22, a parameter memory 23, a clock circuit 24, a scanner 25, a printer 26, a display panel unit 27, an encoding/decoding unit 28, an image memory 29, a Group 3 facsimile modem 30, a network controller 31, a LAN (local area network) interface 12, a floppy disk drive unit 32, and an internal bus 33.

The system controller 21 controls an entire system of the FAX 111 and, specifically, performs various controls including a facsimile data transmission control for transmitting and receiving image information and a data file that contains arbitrary binary data. The system memory 22 stores control programs to be performed by the system controller 21 as well as various kinds of data necessary for the execution of the control programs, and includes a working memory area for use of the system controller 21. The parameter memory 23 stores various kinds of parameters and information specific to the FAX 111. The clock circuit 24 generates clock information.

The scanner 25 reads an image of document at a predetermined resolution. The printer 26 produces an image output at a predetermined resolution. The display panel unit 27 includes various kinds of operational keys and indicators to facilitate the interfacing between an operator and the FAX 111.

The encoding/decoding unit 28 encodes an input image signal to compress the image information for the transmission operation, and decodes compressed information back into information to be outputted. The transmission data memory 29 stores information including image data and data files to be transmitted.

The Group 3 facsimile modem 30 performs the functions of a modem for the Group 3 facsimile machine and includes a low-speed modem function, such as a V.21 modem, for transmitting and receiving communication protocols and a high-speed modem function, such as V.17, V.34, V.29, V.27 ter modems, for mainly transmitting and receiving image information. The network controller 31 includes an automatic transmitting and receiving function and controls connections of the FAX 111 to the PSTN 110.

The floppy disk drive unit 32 writes arbitrary binary data contained in the received data files onto a floppy disk which is a removable data storage medium, using an arbitrary file format.

The internal bus 33 is connected to all of the above-described units of the FAX 111 and allows the communications between the units therethrough. The network controller 31 has direct connections to the Group 3 facsimile modem 30.

In this way, one of the preferred structures of the facsimile machine FAX 111 is arranged.

The network facsimile apparatus 100 is capable of executing a relay transmission function for relaying a specific E-mail referred to as a relay transmission request E-mail. The relay transmission request E-mail contains a text message and/or a data file including arbitrary binary data. A relay transmission request E-mail is generated by an arbitrary terminal machine and sent via the Internet 120 to the network facsimile apparatus 100. Upon receiving the relay transmission request E-mail, the network facsimile apparatus 100 performs a relay transmission operation to transmit the E-mail to a destination facsimile machine designated by the relay transmission request E-mail.

That is, the E-mail is transmitted from a remote calling terminal machine, for example, via the Internet 120 to the network facsimile apparatus 100 and then transmitted from the network facsimile apparatus 100 via the PSTN 110 to the FAX 111, for example. When the FAX 111 is close to the network facsimile apparatus 100, the cost for the transmission of the text message and/or data file in the above-described way can be reduced significantly as compared to the case of transmitting the same information without using the relay transmission request E-mail but exclusively through the PSTN.

The text message and/or data file contained in the relay transmission request E-mail are handled differently during relay transmission operations. For example, a text message is converted into transfer image information so as to be transmitted using the facsimile data transmission procedure, while a data file is transmitted under the Group 3 facsimile file transfer procedure.

Next, one of examples of a relay transmission request E-mail for requesting a text message relay transmission is explained with reference to FIG. 4. An E-mail 40 illustrated in FIG. 4 is one of examples of a relay transmission request E-mail for requesting a text message relay transmission to a destination facsimile machine, i.e. the FAX 111, for example. The E-mail 40 is composed of a header and contents. The header includes various information fields including a "Date" field for indicating time and date of transmission, a "Message-ID (identification)" field for information for identifying a message, a "From" field for indicating a sender's name, a "To" field for indicating a receiver name, and a "Subject" field for indicating a title of message.

In the "To" field of the E-mail 40, supplemental information in parentheses, such as (relay: 0123-4567-8901), specifies a relay transmission request and a destination of the E-mail 40. As such, parenthesized information is read as a meaningful comment in the E-mail system. More specifically, an E-mail which includes a word "relay" in the "To" field thereof is determined as a relay transmission request mail. Further, information following the word "relay" with a colon ":" in between is a telephone number for a destination facsimile machine. The "To" field can indicate a plurality of telephone numbers and, in such a case, the E-mail is sent to all the addresses specified by the plurality of the telephone numbers.

A general requirements for E-mail is to use machine-readable 7-bit codes to write contents. A MIME (multipurpose Internet mail extensions) format according to the RFC 1521 and RFC 1522 is one of the formats which meets the above requirement. The E-mail 40 is assumed to have contents which are a message in Japanese and which are therefore composed of 2-byte Japanese symbol/character codes. This Japanese message may become non-readable when converted into the MIME format and, therefore, the message is expressed using readable Japanese symbols/characters for the sake of convenience. When the message is converted into the MIME format, a "charset", which is explained later, and a conversion of the Japanese character code set are designated in accordance with the RFC1468.

The E-mail header further includes a "MIME-Version" field for indicating a version of the MIME format, a "Content-Type" field for indicating the type of contents, and a "Content-Transfer-Encoding" field for indicating an encoding method applied to a conversion of the contents.

The E-mail header thus identifies properties of the contents of the E-mail and, accordingly, the contents have a text composed of codes contained in a character code set in accordance with the RFC1468.

More specifically, in the case of E-mail 40, the "MIME-Version" field indicates a value "1.0", and the "Content-Type" field indicates a "text/plain" for indicating that the contents are a text and a "charset="ISO-2022-JP"" for indicating that a character code set is defined by an ISO-2022-JP. Further, the "Content-Transfer-Encoding" field indicates a "7 bits" for indicating that the contents are composed of 7-bit codes.

In the way as described above, the relay transmission request E-mail for requesting a text message transmission is arranged.

Next, an example of a relay transmission request E-mail for requesting a relay transmission of an arbitrary data file is explained with reference to FIG. 5. An E-mail 41 illustrated in FIG. 5 is an example of a relay transmission request E-mail for requesting a transmission of an arbitrary data file to a destination, i.e. the FAX 111, for example. The header of the E-mail 41 of FIG. 5 is similar to the E-mail 40 of FIG. 4, except for the following several pieces of information.

The "Content-Type" field of the E-mail 41 indicates an "application/octet-stream" for indicating that the contents of the E-mail 41 are a data file that contains arbitrary application file data and a "name="bunsyo.doc"" for indicting a name of the data file. The "Content-Transfer-Encoding" field of the E-mail 41 indicates a "base 64" for indicating that an applied encoding method is a base 64, which defines rules for data conversion from binary data into 7-bit readable information. In this case, the data file having a file name of "bunsyo.doc" is converted using the base 64 and further converted into the MIME format so as to be transmitted to the network facsimile apparatus 100 as the contents of the E-mail 41.

When the network facsimile apparatus 100 receives the thus-arranged E-mail 41, it examines a value of the "To" field. If the "To" field includes the term "relay", the network facsimile apparatus 100 recognizes that the received E-mail 41, is a relay transmission request E-mail that requests a relay transmission to a facsimile machine specified by a telephone number placed after the word "relay" in the "To" field of the header contained in the received E-mail 41. When the network facsimile apparatus 100 recognizes that the received E-mail 41 is a relay transmission request E-mail, it examines the "Content-Type" field to determine whether the contents are text or not. When the contents are text, the network facsimile apparatus 100 decodes the contents back into original symbol/character codes, which are the Japanese symbol/character codes in the case of the E-mail 41, in accordance with the rules indicated by the information of the "Content-Transfer-Encoding" field. The network facsimile apparatus 100 subsequently generates image data that represent original Japanese symbols/characters corresponding to the original symbol/character codes and then compresses the image data. Then, the network facsimile apparatus 100 initiates a call to the FAX 111, for example, to transmit the thus-compressed image data.

When the contents are not text, the network facsimile apparatus 100 determines that the contents are data of an arbitrary application file and then decodes the contents back into an original data file in accordance with the base 64, so as to generate a transfer data file. Then, the network facsimile apparatus 100 initiates a call to the FAX 111, for example, so as to transmit the transfer data file thereto through a Group 3 facsimile file transfer procedure. In this event, the transfer data file to be transferred preferably indicates the file name "bunsyo.doc", which is indicated in the "Content-Type" field of the received E-mail 41, in a header of the transfer data file.

Upon receiving image information through the Group 3 facsimile communications procedure, the FAX 111 decodes the information into original image data and then produces an image output based on the original image data. Also, upon receiving a data file transferred through the Group 3 facsimile file transfer procedure, the FAX 111 stores the data file into a floppy disk loaded in the floppy disk drive unit 32.

In this way, the network facsimile apparatus 100 is capable of easily performing the relay transmission operation for relaying a text and an arbitrary application data file to a designated facsimile machine via the PSTN 110. As a result, the use of the electronic communications system of FIG. 1 becomes more efficient. This is in part because the relay transmission operation by the network facsimile apparatus 100 can significantly reduce the cost of data transmission, particularly when long distance data transmission is involved.

Figure 6A:
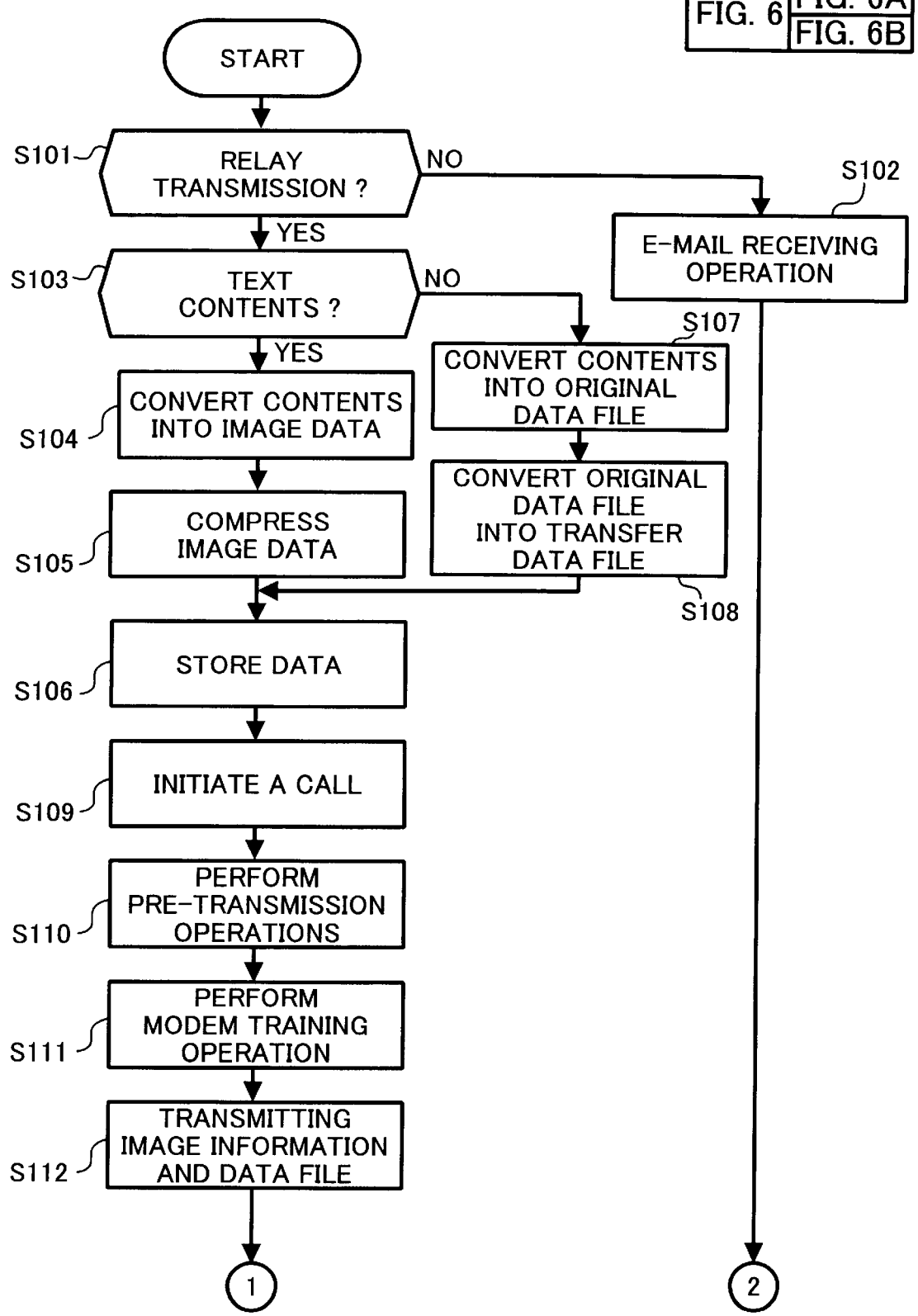
FIG. 6 is a flowchart of an exemplary relay transmission operation performed by the network facsimile apparatus of FIG. 2.
Figure 6B:
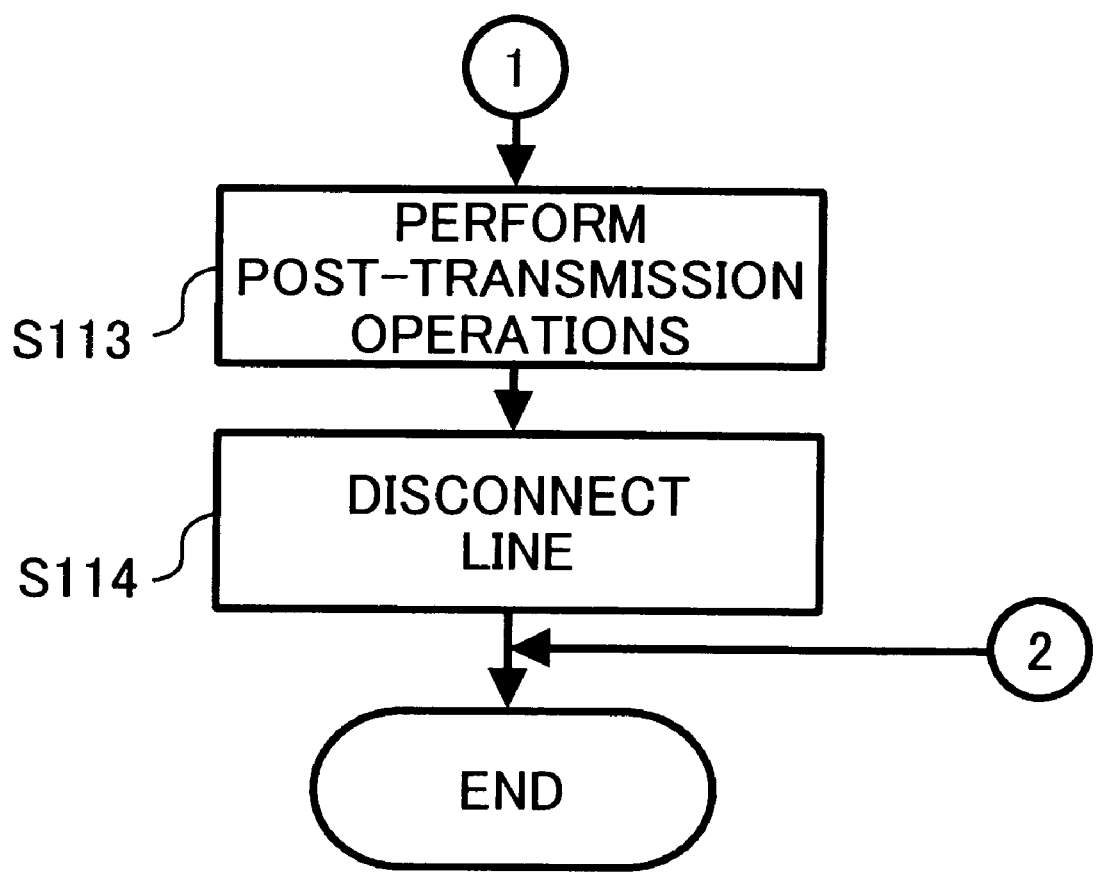

Next, an examples of the relay transmission operation by the network facsimile apparatus 100 is explained with reference to FIG. 6. When the network facsimile apparatus 100 receives one of the above-described types of E-mails 40 and 41, the system controller 1 thereof determines whether the "To" field in the header of the received E-mail includes the word "relay", in Step S101 of FIG. 6, so as to determine if the received E-mail is a relay transmission request E-mail. When the word "relay" is not included in the "To" field and the determination result of Step S101 is NO, the system controller 1 proceeds to Step S102 and performs a general operation for the E-mail receiving procedure. Then, the process ends.

When the word "relay" is included in the "To" field and the determination result of Step S101 is YES, the system controller 1 determines that the received E-mail is requesting relay transmission. Then, the process proceeds to Step S103 and the system controller 1 determines whether the "Content-Type" in the header includes the word "text" so as to determine if the content of the received E-mail is text.

When the word "text" is included in the "Content-Type" and the determination result of Step S103 is YES, the system controller 1 determines that the content of the received E-mail is text and the process proceeds to Step S104. Then, in Step S104, the system controller 1 instructs the encoding/decoding unit 8 to decode the contents of the received E-mail in the MIME format back into original symbol/character codes, which is the Japanese symbol/character codes in this case, in accordance with the information indicated in the "Content-Transfer-Encoding" field and then to convert the original Japanese symbol/character codes into corresponding image data. Then, in Step S105, the system controller 1 further instructs the encoding/decoding unit 8 to compress the thus-created image data and to form transfer image information to be transmitted. Then, the system controller 1 stores the compressed transfer image information into the image memory 9, in Step S106.

When the received E-mail is not the E-mail 40 but the E-mail 41, the "Content-Type" does not include the word "text" and the determination result of Step S103 is NO. In this case, the system controller 1 determines that the contents of the received E-mail are arbitrary application file data. Then, the process proceeds to Step S107. The system controller 1 instructs the encoding/decoding unit 8 to decode the contents of the MIME formatted mail back into original arbitrary application file data in accordance with the base 64, which is indicated in the "Content-Transfer-Encoding" field. Based on the above original arbitrary application file data, in Step S108, the system controller 1 further instructs the encoding/decoding unit 8 to create a transfer data file to be transferred through the Group 3 facsimile file transfer procedure. Then, the process proceeds to Step S106 and the system controller 1 stores the transfer data file into the image memory 9.

Also, in Step S108, the system controller 1 arranges to give several kinds of header information necessary to the transfer data file, which are explained later.

In Step S109, the system controller 1 instructs the network controller 11 to originate a call according to a telephone number indicated after the word "relay" in the "To" field. In Step S110, the network controller 11 performs a pre-transmission operation to set a transfer function depending upon the type of transmission. In this event, the network controller 11 sets the ECM mode to transfer the image information or the file transfer mode to transfer the data file. In Step S111, the network controller 11 further performs a general modem training operation at a certain modem speed to determine a suitable modem speed. Then, in Step S112, the image information or the data file is transferred to a destination.

After completing transmission, the network controller 11 performs a general after-transmission operation, in Step S113. Then, the network controller 11 disconnect the line in Step S114, thereby ending the relay transmission operation.

In this way, the network facsimile apparatus 100 performs the relay transmission operation when it receives one of the relay transmission request E-mails 40 and 41.

The user may need to have some idea of the contents before decoding the MIME-formatted data when receiving at the FAX 111 the relayed E-mail having the arbitrary application data file contents in the MIME format. For this purpose, a kind of delivery note such as a headline, for example, with respect to the arbitrary application data file, can preferably be transferred together with the arbitrary application data file during the relay transmission operation. By receiving such a delivery note, the user can conveniently get some idea about the contents of the arbitrary application data file contained in the relayed E-mail before decoding the MIME-formatted data. An E-mail in a so-called multi-part MIME (multipurpose Internet mail extensions) format is useful for this purpose.

Figure 7:
FIG. 7 is an example of a multi-part relay transmission request E-mail to be transmitted to the network facsimile apparatus of FIG. 2.

Next, an example of a relay transmission request E-mail having the above-mentioned multi-part MIME format is explained with reference to FIG. 7. An E-mail 42 illustrated in FIG. 7 is a relay transmission request E-mail having the multi-part MIME format for requesting a relay transmission to the destination facsimile machine FAX 111, for example. As shown in FIG. 7, the E-mail 42 includes three information files and a common header. A first information file X1 contains text contents Y1. Second and third information files X2 and X3 contain data file contents Y2 and Y3, respectively, which are converted from arbitrary application file data according to the base 64. Each of the first, second, and third information files X1, X2, and X3 includes sub-headers which are referred to as first, second, and third headers Z1, Z2, and Z3. The common header Z0 is arranged on top of the first information file X1.

The "Content-Type" field in the common header Z0 contains the words "multi-part/mixed" for indicating that the present E-mail includes multiple information files X1, X2, and X3, including multiple contents Y1, Y2, and Y3, respectively, in the multi-part MIME format. The common header Z0 further includes a "boundary" field for indicating a series of characters which represents a boundary between two adjacent information files. Each of the sub-headers Z1, Z2, and Z3 includes the boundary, "Content-Type", and "Content-Transfer-Encoding" fields, as illustrated in FIG. 7.

When receiving this type of E-mail, the network facsimile apparatus 100 handles the respective information files in a way that distinguishes the type of contents. When the file is the text information file and the contents thereof accordingly are text, the network facsimile apparatus 100 converts the contents into original symbol/character codes according to the information in the "Content-Transfer-Encoding" field. In the case of the E-mail 42, the contents Y1, which is text, are converted into original Japanese symbol/character codes. Then, the network facsimile apparatus 100 generates image data for depicting Japanese symbols and characters corresponding to the original Japanese symbol/character codes. The thus-generated image data are compressed so that transfer image information for the contents Y1 of the image information file X1 is generated so as to be transmitted to a designated destination facsimile machine, i.e. FAX 111, for example.

When the information file is a data file, the network facsimile apparatus 100 determines that the contents of the information file are arbitrary application file data and, therefore, decodes the contents into an original data file according to the base 64 encoding method. Based on the thus-generated data file, a transfer data file is created so as to be transmitted to a designated destination facsimile machine. i.e. FAX 111, for example. The transfer data file includes a header indicating various types of information, and it is preferable to indicate in the header the file name, i.e. "xxxxxx" indicated in the "Content-Type" field of the received E-mail 42.

After completing the above-described preparations, the network facsimile apparatus 100 initiates a call to the designated destination facsimile machine, i.e. FAX 111, for example, and transmits the appropriate transfer image information and transfer data files thereto. During this operation, each of the image information files and each of the data files exclusively share an individual set of pages and an individual data file, respectively.

In this way, the network facsimile apparatus 100 performs the multi-part MIME formatted relay transmission operation when receiving a relay transmission request E-mail according to the multi-part MIME format.

Figure 8:
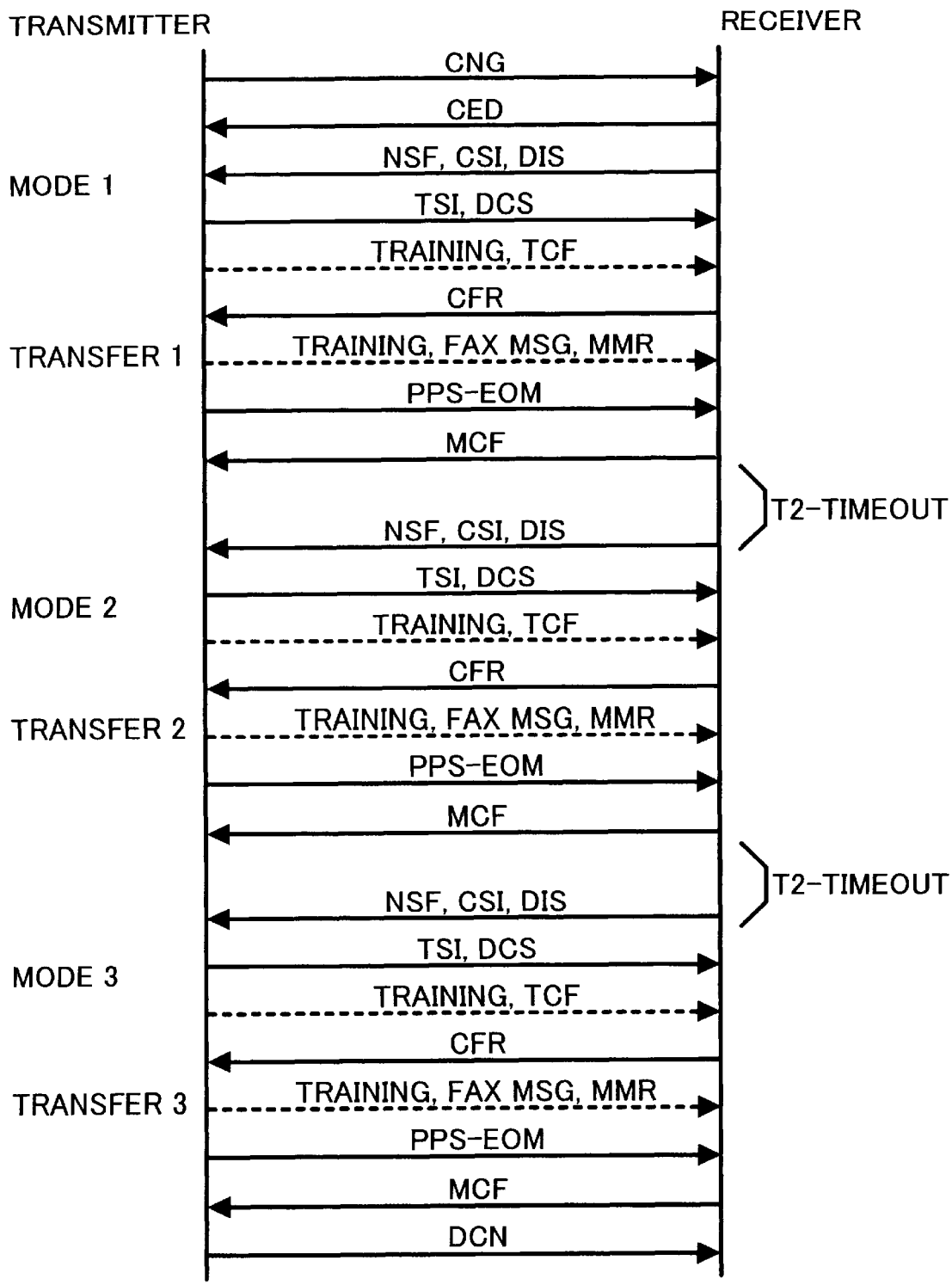

Next, an exemplary way of transmitting multiple information files contained in an exemplary multi-part MIME formatted relay transmission request E-mail is explained with reference to FIG. 8. A data transmission procedure of FIG. 8 is based on the case when the network facsimile apparatus 100 receives the E-mail 42 of FIG. 7. The transmitter and receiver in FIG. 8 are the network facsimile apparatus 100 and the FAX 111, respectively, for example.

In FIG. 8, the network facsimile apparatus 100 calls the FAX 111 and performs a general pre-transmission procedure. At this time, the network facsimile apparatus 100 establishes an ECM/MMR (error correction mode/modified modified read) data transmission mode which is referred to as a mode 1, since information to be first transmitted in the E-mail 42 of FIG. 7 is the first information file which is image information. Then, a modem training operation is performed, in which a relatively high transmission speed for image information is determined. Upon a completion of the modem training operation, the first information file is read from the image memory 9 and transmitted to the FAX 111 through the ECM (error correction mode) procedure, which step is referred to as a transfer 1. After the step of the transfer 1, the network facsimile apparatus 100 sends a PPS-EOM (partial page signal—end of massage) as a post-transmission signal to the FAX 11 so as to return a transmission phase to a so-called phase B which is for transmission of protocols at a relatively low transmission speed.

Since the information file to be next transmitted is the second information file which is a data file, the network facsimile apparatus 100 establishes an ECM/BFT (error correction mode/binary file transfer) data transmission mode which is referred to as a mode 2. Then, a modem training operation is performed, in which a relatively high transmission speed for a data file is determined. After the modem training operation, the second information file is read from the image memory 9 and transmitted to the FAX 111 through the file transfer procedure, which step is referred to as a transfer 2. Upon completing the step of transfer 2, the network facsimile apparatus 100 sends a PPS-EOM (partial page signal—end of message) as a post-transmission signal to the FAX 111 so as to return a transmission phase to the phase B again.

The following information file to be further transmitted is the third information file which is again a data file, and the network facsimile apparatus 100 establishes an ECM/BFT (error correction mode/binary file transfer) data transmission mode in the same manner as described above for the second information file. The established transmission mode is referred to as a mode 3. The modem training operation is performed. Then, the third information file is read from the memory 9 to the FAX 111 and transmitted through the file transfer procedure, which step is referred to as a transfer 3. Upon completing the step of transfer 3, the network facsimile apparatus 100 performs a general post-transmission procedure to disconnect the line and then ends the relay transmission operation.

During the transmission procedures described above, the transmission phase is returned to the phase B each time of transmission. Since protocol communications in the phase B can be started only after a time out, counted by a timer T2 (not shown), according to the Group 3 facsimile transmission procedure, the network facsimile apparatus 100 is required to wait for a period of a time-out T2, i.e. 6 seconds, each time.

Figure 10A:
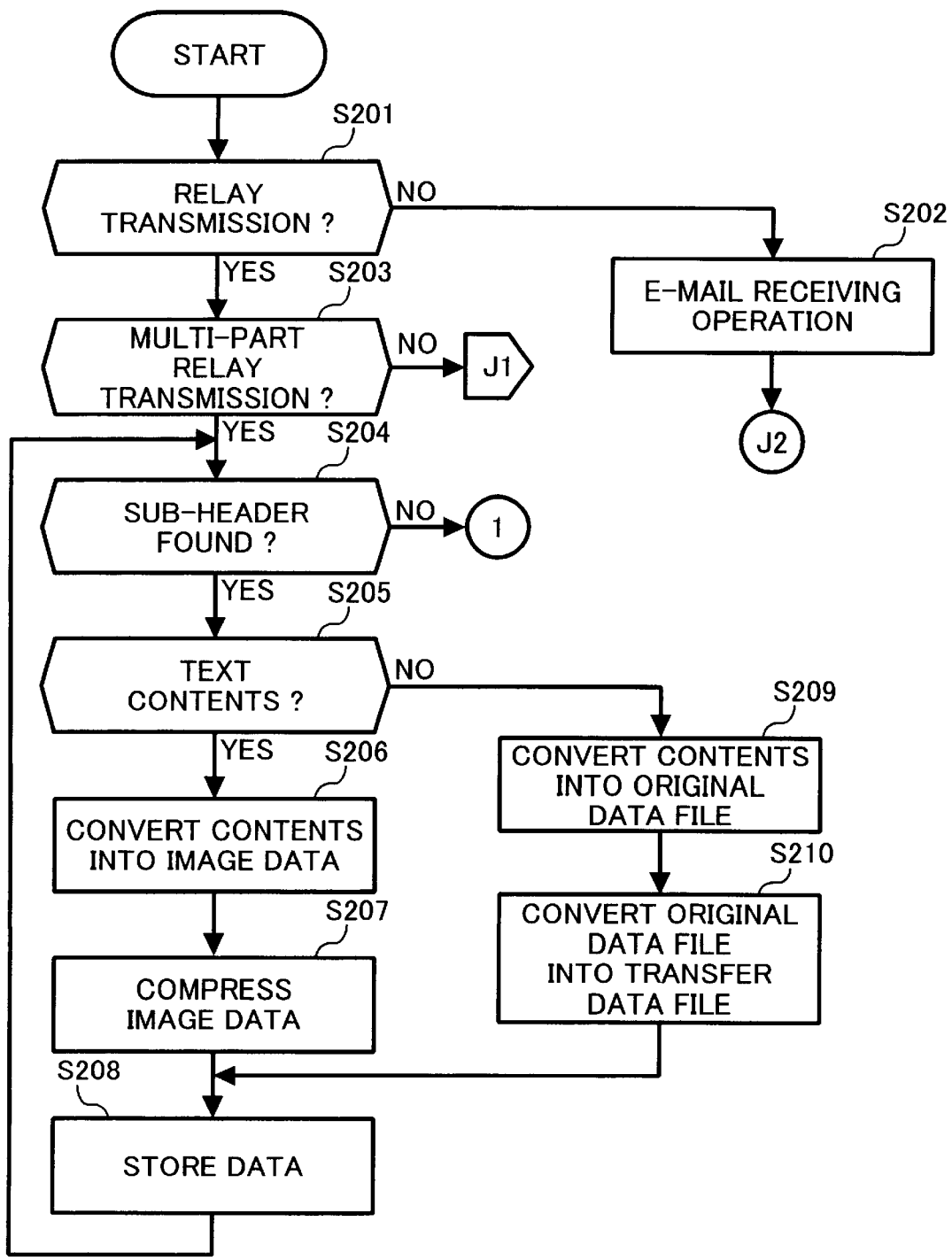
FIGS. 10(a) and 10(b) are flowcharts of an exemplary multi-part relay transmission operation performed by the network facsimile apparatus of FIG. 2.
Figure 10A:
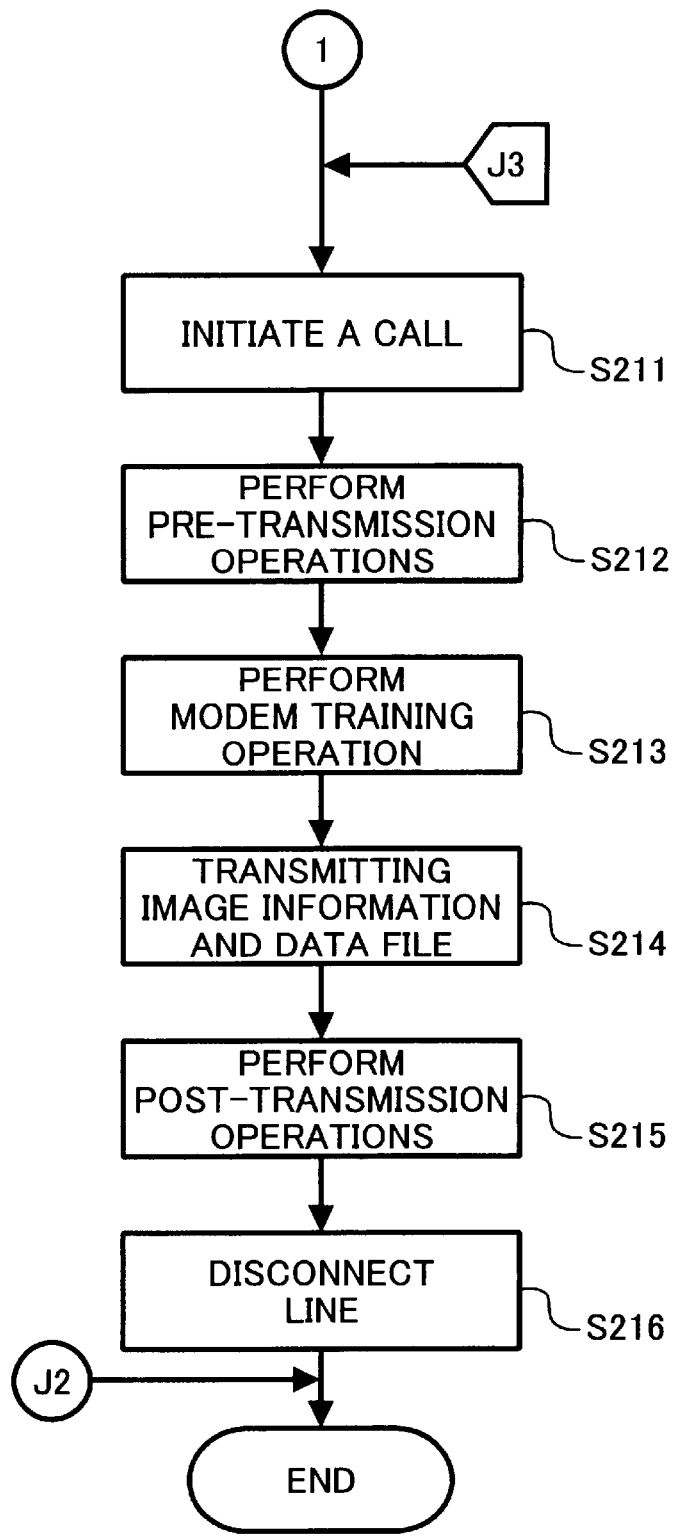

Next, an exemplary modified way of transmitting multiple information files contained in the multi-part MIME formatted relay transmission request E-mail is explained with reference to FIG. 9. A data transmission procedure of FIG. 9 is similar to that shown in FIG. 8, except for an elimination of the mode 3 and some relevant steps for returning to phase B. That is, the second and third information files are successively transmitted as if they are one continuous file. After the step of transfer 2, the network facsimile apparatus 100 sends a PPS-MPS (partial page signal—multiple page signal) as a post-transmission signal to return to the data transmission phase, so as to transmit the third information file continuously following the second information file transfer procedure. In this way, the network facsimile apparatus 100 can avoid the return step to phase B and relevant steps when receiving the multi-part MIME formatted relay transmission request E-mail that contains a plurality of data files. As a result, the network facsimile apparatus 100 can perform a relatively high speed relay transmission operation. Next, an exemplary performance of the network facsimile apparatus 100 upon a receipt of a multi-part MIME formatted relay transmission request E-mail is explained with reference to FIGS. 10(*a*) and 10(*b*). In Step S201 of FIG. 10(*a*), the system controller 1 of the network facsimile apparatus 100 examines a value of the "To" field of the header of the received E-mail to determine whether the "To" field includes the word "relay". If the "To" field does not includes the word "relay" and the result of Step S201 is NO, the system controller 1 determines that the received E-mail is not a relay transmission request E-mail and the process proceeds to Step S202 to process the received E-mail through a predetermined E-mail receiving procedure. Then, the process ends.

When the "To" field of the header of the received E-mail includes the word "relay" and the result of Step S201 is YES, the system controller 1 determines that the received E-mail is a relay transmission request E-mail and the process proceeds to Step S203 to further examine a value of the "Content-Type" field of the header of the received relay transmission request E-mail to determine whether the "Content-Type" field includes the word "multi-part". When the "Content-Type" field includes the word "multi-part" and the result of Step S203 is YES, the system controller 1 determines that the received relay transmission request E-mail is a multi-part MIME formatted relay transmission request E-mail and that the header of the mail is the common header Z0 and the process proceeds to Step S204. Then, in Step S204, the system controller 1 detects the series of characters for the boundary successively followed by the "Content-Type" field to find the sub-headers, such as the Z1, Z2, Z3, and so forth.

When the network facsimile apparatus 100 finds the sub-header Z1 and the result of Step S204 is YES, the process proceeds to Step S205 and the system controller 1 further examines a value of the "Content-Type" field contained in the sub-header Z1 to determine whether the "Content-Type" field includes the word "text". When the "Content-Type" field of the sub-header Z1 includes the word "text" and the result of Step S205 is YES, the system controller 1 determines that the contents of the information file having the sub-header Z1 is a MIME formatted text.

Then, in Step S206, the MIME formatted text after the sub-header Z1 is decoded back into original symbol/character codes, which is the Japanese symbol/character codes in this exemplary case, according to the decoding method indicated in the "Content-Transfer-Encoding" field. Based on the thus-obtained original Japanese symbol/character codes, corresponding image data is generated. In Step S207, the image data is compressed so that transfer image information to be transmitted to a destination is generated. In Step S208, the thus-compressed transfer image information is stored into the image memory 9. Then, the process returns to Step S204 to find the next sub-header.

When the "Content-Type" field of the sub-header Z1 does not include the word "text" and the result of Step S205 is NO, the system controller 1 determines that the contents of the information file having the sub-header Z1 are arbitrary application file data. Then, the process proceeds to Step S209. In Step S209, the MIME formatted arbitrary application file data after the sub-header Z2 are decoded into original arbitrary application file data using the base 64 indicated in the "Content-Transfer-Encoding" field. Subsequently, in Step S210, the original arbitrary application file data are compressed so as to generate a transfer data file to be transferred to the destination through the file transfer procedure. Then, the process proceeds to Step S208 and the compressed transfer data file is stored into the image memory 9.

Also, in Step S210, the system controller 1 arranges to establish several kinds of header information necessary to the transfer data file, which are explained later.

When the series of characters for the boundary is not successively followed by the "Content-Type" field, the boundary indicates that the last information file has been ended. Therefore, when the system controller 1 detects that the series of characters for the boundary which is not successively followed by the "Content-Type" field, it determines that the last information file has been processed. Accordingly, the contents of all the information files are stored as the image information and the transfer data files in the image memory 9 by this time. This is a case when the result of Step S204 is NO.

In this case, the system controller 1 instructs the network controller 11 to originate a call to a facsimile machine having a telephone number indicated after the word "relay" in the "To" field of the common header Z0, in Step S211. In Step S212, the network controller 11 performs a pre-transmission operation to determine a transfer function depending upon the type of transmission. In Step S213, the network controller 11 further performs a general modem training operation at a certain modem speed to determine a suitable transmission speed.

The data transmission procedure in Step S214 is determined according to the type of the information to be transmitted. The network controller 11 performs the ECM/MMR data transmission mode operation for transmitting image information and the ECM/BFT data transmission operation to transmitting a transfer data file.

After completing the transmission of information in Step S214, the network controller 11 performs a general after-transmission operation in Step S215. Then, the network controller 11 disconnect the line in Step S216, thereby ending the relay transmission operation.

Figure 10B:
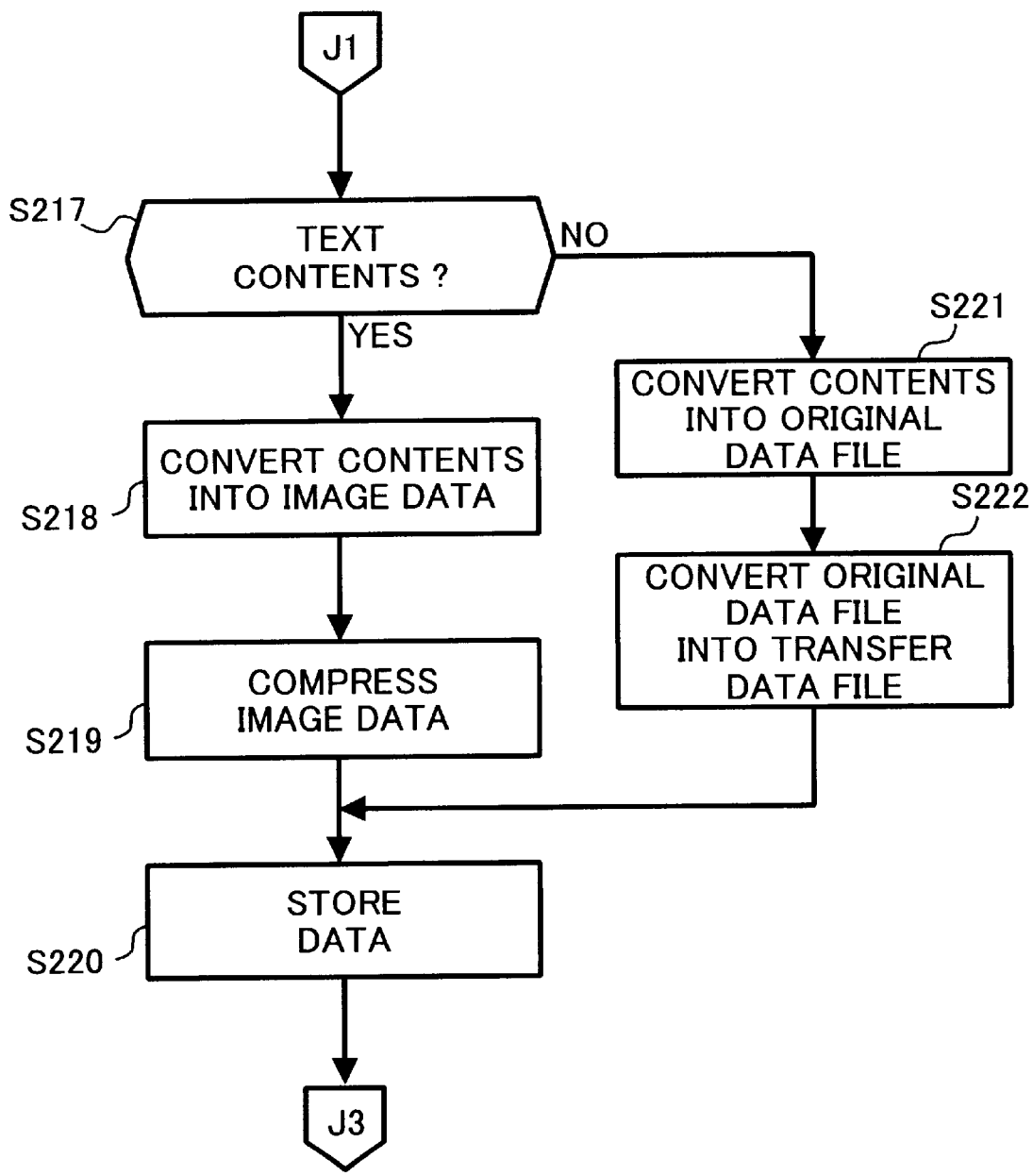
Figure 11A:
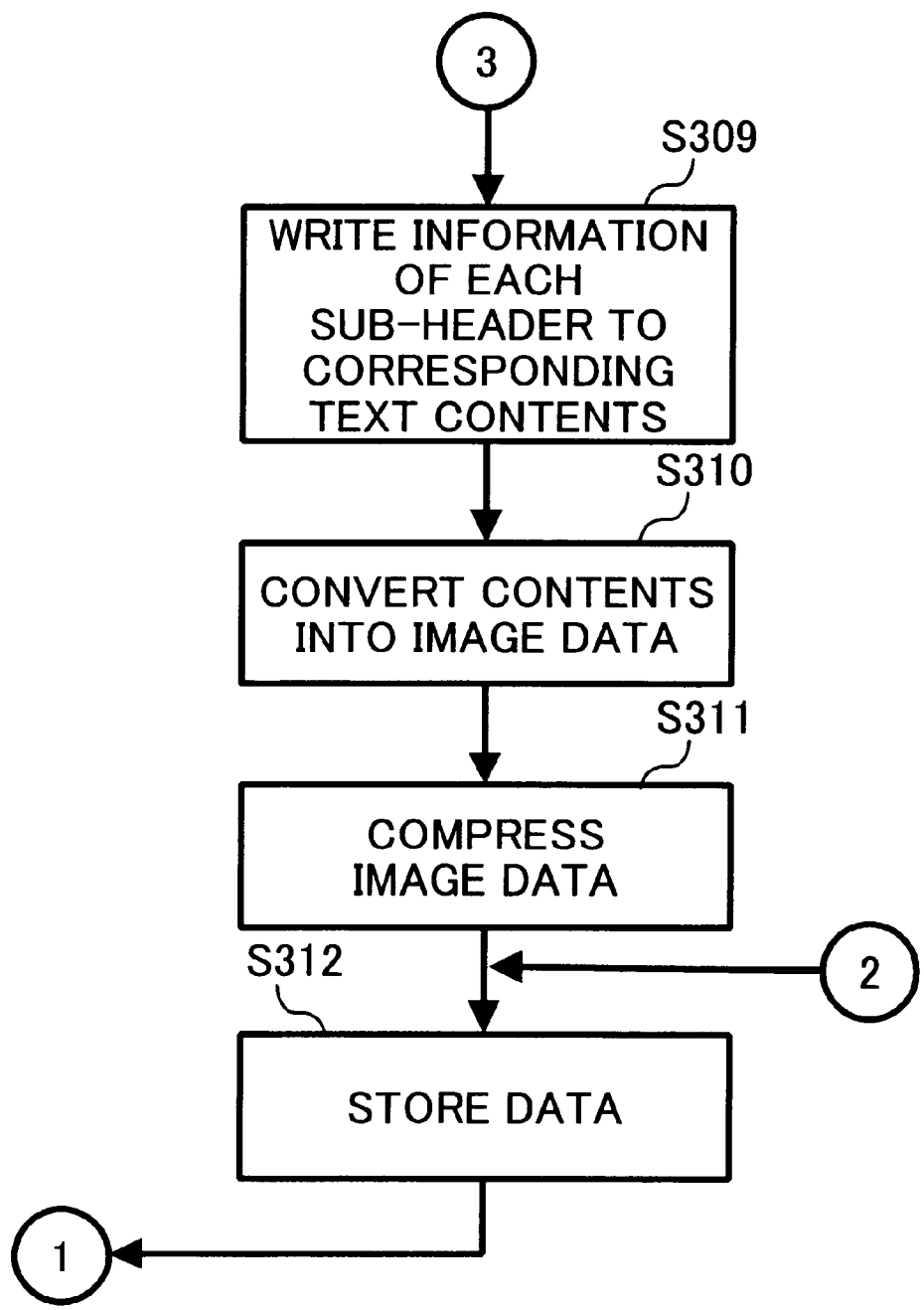
FIGS. 11(a)–11(c) are flowcharts of another exemplary multi-part relay transmission operation performed by the network facsimile apparatus of FIG. 2.
Figure 11B:
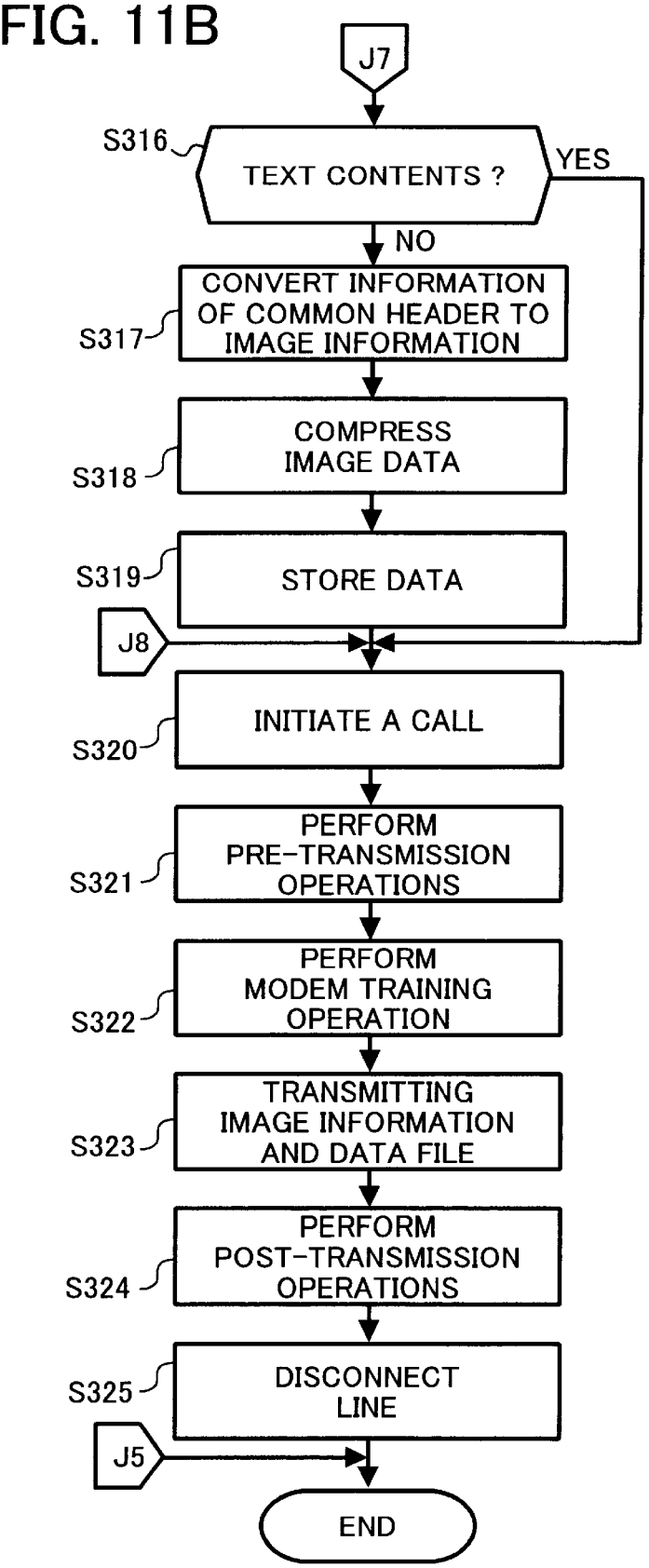
Figure 11C:
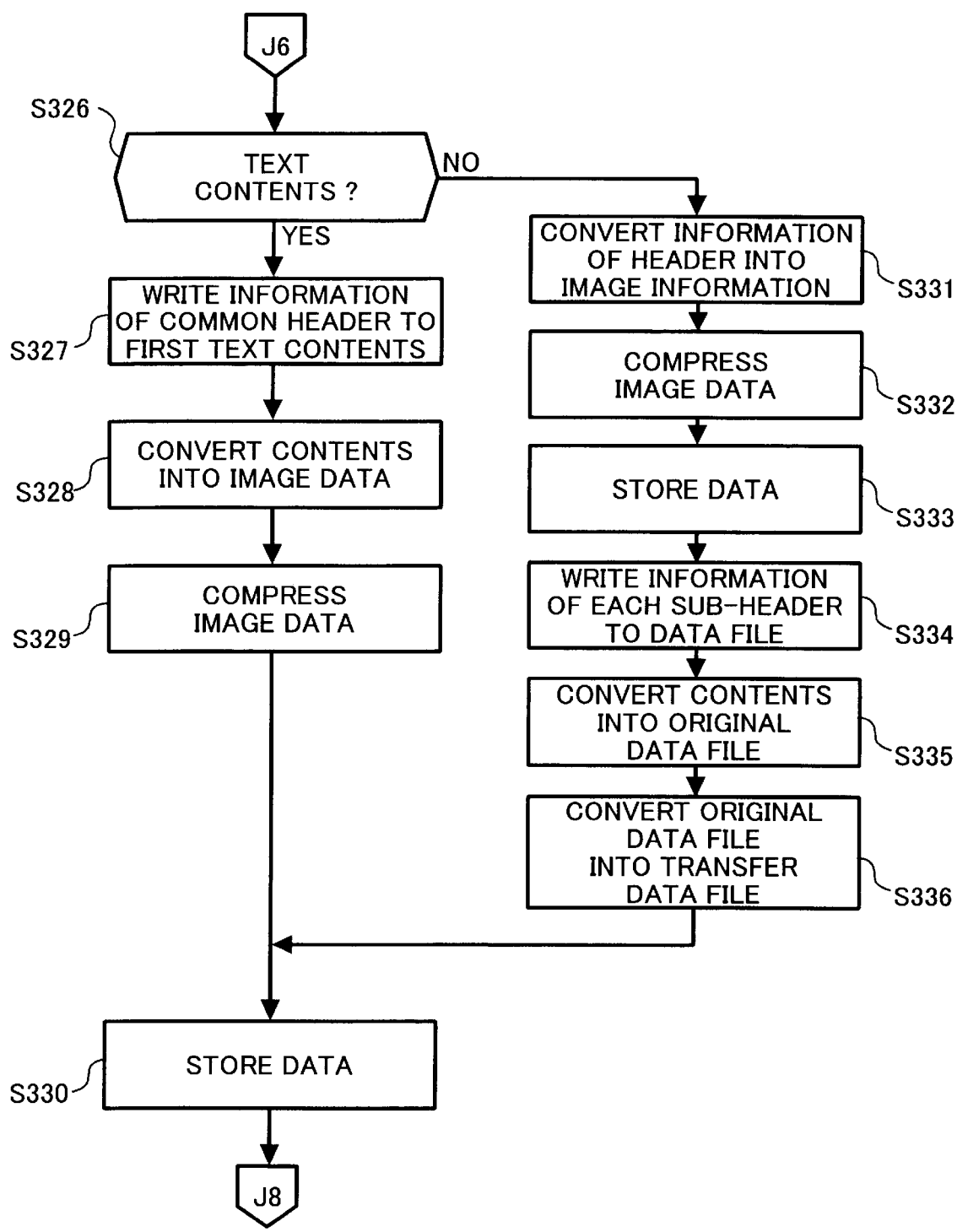

When the "Content-Type" field of the header of the received relay transmission request E-mail does not include the word "multi-part" and the result of Step S203 is NO, the system controller 1 determines that the received relay transmission request E-mail is not a multi-part MIME formatted relay transmission request E-mail and the process proceeds to Step S217 of FIG. 10(b). Then, in Step S217, the system controller 1 further examines a value of the "Content-Type" field of the header of the received relay transmission request E-mail to determine whether the "Content-Type" field includes the word "text". When the "Content-Type" field includes the word "text" and the result of Step S217 is YES, the system controller 1 determines that the contents of the received relay transmission request E-mail are a MIME formatted text. The process then proceeds to Step S218. In Step S218, the MIME formatted text is decoded into original symbol/character codes according to the encoding method indicated in the "Content-Transfer-Encoding" field and, then, the original symbol/character codes are converted into corresponding image data. Then, in Step S219, the thus-created image data are compressed to form transfer image information to be transmitted. In Step S220, the compressed transfer image information is stored into the image memory 9. Then, the process proceeds to Step S211 to perform transmission of the transfer image information to the destination facsimile machine.

When the "Content-Type" field does not include the word "text" and the result of Step S217 is NO, the system controller 1 determines that the contents of the received relay transmission request E-mail are arbitrary application file data. Then, the process proceeds to Step S221. In Step S221, the MIME formatted arbitrary application file data are decoded into original arbitrary application file data using the base 64 indicated in the "Content-Transfer-Encoding" field. Subsequently, in Step S222, the original arbitrary application file data are compressed so as to generated a transfer data file to be transferred to the destination through the file transfer procedure. Then, the process proceeds to Step S220 and the compressed transfer data file is stored into the image memory 9.

Also, in Step S222, the system controller 1 arranges to establish several kinds of header information necessary to the transfer data file, which are explained later.

After Step S220, the process proceeds to Step S211 and the image information or the data file stored in the image memory 9 is transmitted to a destination facsimile machine in the same way as described above through Steps S211 to S216.

In this way, the network facsimile apparatus 100 performs the relay transmission operation when receiving a multi-part MIME formatted relay transmission request E-mail.

Next, another exemplary performance of the network facsimile apparatus 100 upon a receipt of a multi-part MIME formatted relay transmission request E-mail is explained with reference to FIGS. 11(a)–11(c) and 12. In Step S301 of FIG. 11(a), the system controller 1 of the network facsimile apparatus 100 examines a value of the "To" field of the header of the received E-mail to determine whether the "To" field includes the word "relay". If the "To" field does not include the word "relay" and the result of Step S301 is NO, the system controller 1 determines that the received E-mail is not a relay transmission request E-mail and the process proceeds to Step S302 to process the received E-mail through a predetermined E-mail receiving procedure. Then, the process ends.

When the "To" field of the header of the received E-mail includes the word "relay" and the result of Step S301 is YES, the system controller 1 determines that the received E-mail is a relay transmission request E-mail and the process proceeds to Step S303 in which the system controller 1 stores the information of the common header Z0 into the system memory 2. Then, in Step S304, the system controller 1 examines a value of the "Content-Type" field of the header of the received relay transmission request E-mail to determine whether the "Content-Type" field includes the word "multi-part". When the "Content-Type" field includes the word "multi-part" and the result of Step S304 is YES, the system controller 1 determines that the received relay transmission request E-mail is a multi-part MIME formatted relay transmission request E-mail and that the header of the mail is the common header Z0 and the process proceeds to Step S305. Then, in Step S305, the system controller 1 detects the series of characters for the boundary successively followed by the "Content-Type" field to find the sub-headers, such as the Z1, Z2, Z3, and so forth.

When the network facsimile apparatus 100 finds one of the sub-headers and the result of Step S305 is YES, the process proceeds to Step S306 and the system controller 1 further examines a value of the "Content-Type" field contained in the found sub-header to determine whether the "Content-Type" field includes the word "text". When the "Content-Type" field of the found sub-header includes the word "text" and the result of Step S306 is YES, the system controller 1 determines that the contents of the information file having the found sub-header is a MIME formatted text.

In Step S307, the system controller 1 determines whether the information file having the found sub-header is the first text information file having the sub-header Z1. When the information file having the found sub-header is the first text information file having the sub-header Z1 and the determination result in Step S307 is YES, the process proceeds to Step S308 and the system controller 1 pastes the information of the common header Z0 stored in the system memory 2 into the contents of the information file having the sub-header Z1. In Step S309, the system controller 1 further pastes the information of the sub-header Z1 into the contents of itself. When the information file having the found sub-header is not the first text information having the found sub-header Z1 and the determination result in Step S307 is NO, the process jumps to Step S309. In this way, information of the common header Z0 and the sub-header Z1 can be pasted into the contents of the first text information file while only information of sub-headers is pasted into the contents of information files other than the first text information file.

In Step S310, the MIME formatted text contents after the sub-header Z1, having the information of the common header Z0 and the sub-header Z1, are decoded back into original symbol/character codes, which is the Japanese symbol/character codes in this exemplary case, according to the decoding method indicated in the "Content-Transfer-Encoding" field. Based on the thus-obtained original Japanese symbol/character codes, corresponding image data is generated. In Step S311, the image data is compressed so that transfer image information to be transmitted to a destination is generated. In Step S312, the thus-compressed transfer image information is stored into the image memory 9. Then, the process returns to Step S305 to find the next sub-header.

Figure 12:
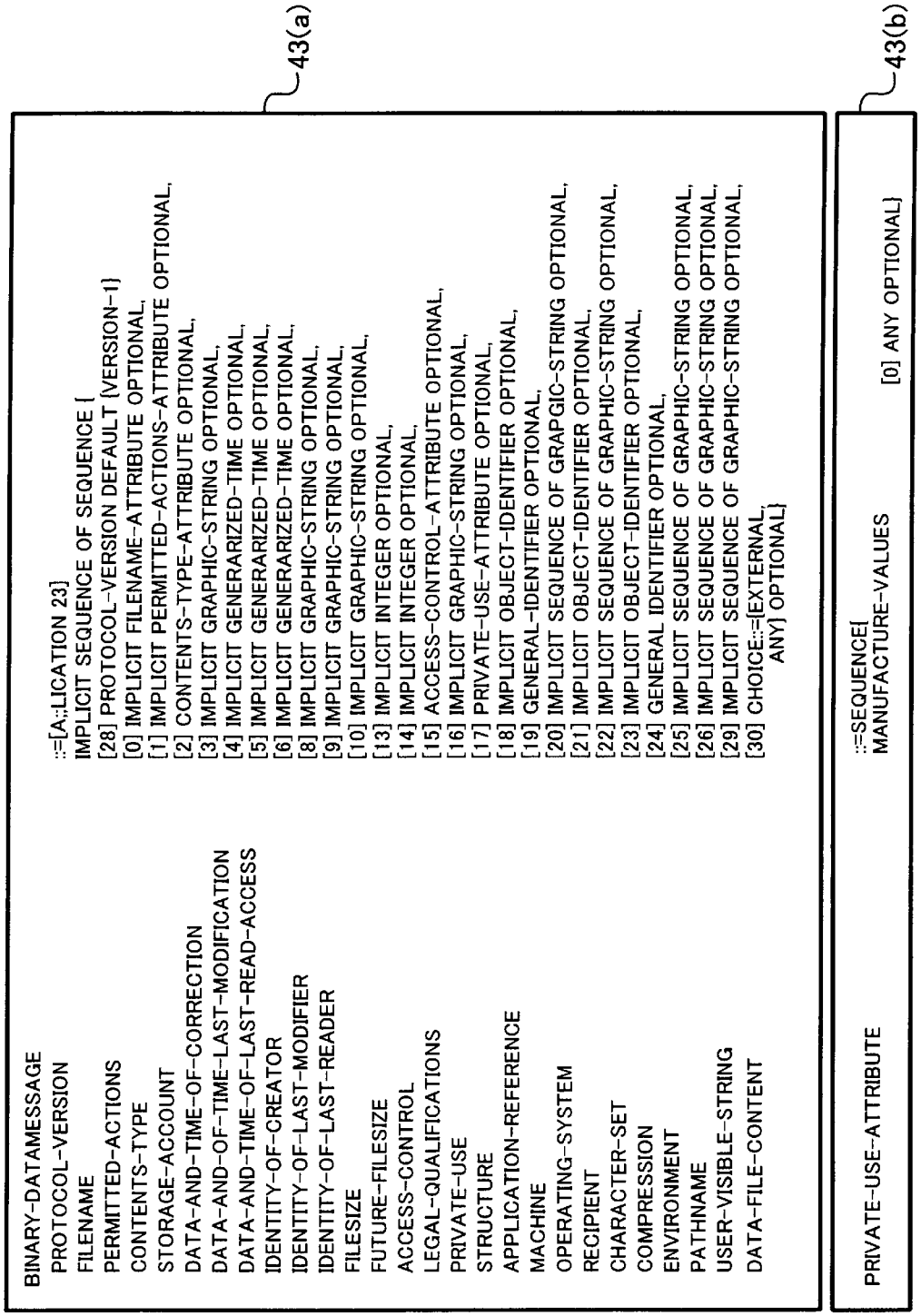
FIG. 12 is an exemplary list of header information for a data file contained by an exemplary relay transmission request E-mail to be transmitted to the network facsimile apparatus of FIG. 2.

When the "Content-Type" field of the found sub-header does not include the word "text" and the result of Step S306 is NO, the system controller 1 determines that the contents of the information file having the found sub-header are arbitrary application file data. Then, the process proceeds to Step S313. In Step S313, the system controller 1 copies the information of the found sub-header and pastes the information into a predetermined place in the header of the arbitrary application file data. This predetermined place for indicating the information of the found sub-header can be a "private-use-Attribute", for example, in the header of the arbitrary application file data. As an example, an information list 43(*a*) for the header of the arbitrary application file data, in which the "private-use-Attribute" is included, and an information list 43(*b*) for the "private-use-attribute" are shown in FIG. 12.

In Step S314, the MIME formatted arbitrary application file data after the found sub-header are decoded into original arbitrary application file data according to the base 64 indicated in the "Content-Transfer-Encoding" field. In Step S315, the original arbitrary application file data are compressed so as to generate a transfer data file to be transferred to the destination through the file transfer procedure. Then, the process proceeds to Step S312 and the compressed transfer data file is stored into the image memory 9. Then, the process further proceeds to Step S305 to search a next sub-header.

When the series of characters for the boundary is not successively followed by the "Content-Type" field, the boundary indicates that the last information file has been ended. Therefore, when the system controller 1 detects the series of characters for the boundary which is not successively followed by the "Content-Type" field, it determines that the last information file has been processed. Accordingly, contents of all the information files are stored as the image information and the transfer data files in the image memory 9 by this time. This is a case when the result of Step S305 is NO.

In this case, the process proceeds to Step S316 of FIG. 11(*b*). In Step S316, the system controller 1 determines whether the received E-mail includes no information file having text contents. When the received E-mail includes no information file having text contents and the determination result of Step S316 is NO, the process proceeds to Step S317. Then, the system controller 1 controls the encoding/decoding unit 8 to convert the information of the common header into image data in Step S317, to compress the image data in Step S318, and to store the compressed image data into the image memory 9 in Step S319. Then, the process proceeds to Step S320. When the received E-mail includes an information file having text contents and the determination result of Step S316 is YES, the process jumps to Step S320.

In Step S320, the system controller 1 instructs the network controller 11 to originate a call according to a telephone number indicated after the word "relay" in the "To" field. In Step S321, the network controller 11 performs a pretransmission operation to set a transfer function depending upon the type of transmission. In this event, the network controller 11 sets the ECM mode to transfer the image information or the file transfer mode to transfer the data file. In Step S322, the network controller 11 further performs a general modem training operation at a certain modem speed to determine a suitable modem speed.

After completing transmission, the network controller 11 performs a general after-transmission operation, in Step S324. Then, the network controller 11 disconnect the line in Step S325, thereby ending the relay transmission operation.

When the "Content-Type" field of the header of the received relay transmission request E-mail does not include the word "multi-part" and the result of Step S304 is NO, the system controller 1 determines as that the received relay transmission request E-mail is not a multi-part MIME formatted relay transmission request E-mail and the process proceeds to Step S326 of FIG. 11(*c*). Then, in Step S326, the system controller 1 further examines a value of the "Content-Type" field of the header of the received relay transmission request E-mail to determine whether the "Content-Type" field includes the word "text". When the "Content-Type" field includes the word "text" and the result of Step S326 is YES, the system controller 1 determines as that the contents of the received relay transmission request E-mail is a MIME formatted text. The process then proceeds to Step S327. In Step S327, the system controller 1 pastes the information of the common header stored in the system memory 2 into the text contents of the information file of the received E-mail. In this way, information of the common header can be pasted into the contents of the text information file.

After pasting the header into the text contents, the process proceeds to Step S328. In Step S328, the MIME formatted text of the received E-mail is decoded back into original symbol/character codes, which is the Japanese symbol/character codes in this exemplary case, according to the decoding method indicated in the "Content-Transfer-Encoding" field. Based on the thus-obtained original Japanese symbol/character codes, corresponding image data is generated. In Step S329, the image data is compressed so that transfer image information to be transmitted to a destination is generated. In Step S330, the thus-compressed transfer image information is stored into the image memory 9. Then, the process returns to Step S320 to transfer the transfer image information stored in the image memory 9.

When the "Content-Type" field of the received E-mail does not include the word "text" and the result of Step S326 is NO, the system controller 1 determines that the contents of the information file of the received E-mail are arbitrary application file data. Then, the process proceeds to Step S331. The system controller 1 controls the encoding/decoding unit 8 to convert the information of the common header into image data in Step S331, to compress the image data in Step S332, and to store the compressed image data into the image memory 9 in Step S333.

Then, in Step S334, the system controller 1 copies the information of the common header of the received E-mail into a predetermined place in the header of the arbitrary application file data. This predetermined place for indicating the information of the found sub-header can be the "private-use-Attribute", for example, in the header of the arbitrary application file data.

Then, in Step S335, the MIME formatted arbitrary application file data of the received E-mail are decoded into original arbitrary application file data according to the base 64 indicated in the "Content-Transfer-Encoding" field. In Step S336, the original arbitrary application file data are compressed so as to generate a transfer data file to be transferred to the destination through the file transfer procedure. Then, the process proceeds to Step S330 and the compressed transfer data file is stored into the image memory 9.

After Step S330, the process returns to Step S320 and either the image information or the data file stored in the image memory 9 is transmitted to a destination facsimile machine in the same way as described above through Steps S320 to S325.

In this way, the header information can be pasted into the text contents or the arbitrary application file data, so that the user can recognize the contents when receiving a relay transmission request E-mail.

As a feature, when a plurality of text information files and a plurality of data files are contained in a multi-part MIME formatted relay transmission request E-mail, transmission time can be reduced by combining all the text information files into a first text information file and, as a result, all the data files will be made as one data file.

As another feature, a request of relay transmission may be accomplished by placing information for request into the contents, for example although a telephone number for a destination is placed in the "To" field in order to request a relay transmission in the above-described embodiment.

As another feature, the FAX 111 may transmits received image information or data file to a personal computer, for example, although the FAX 111 stores them into a floppy disk in the above-described embodiment.

This disclosed system and method may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The disclosed system and method may also be implemented by the preparation of application specific integrated circuits or by interconnecting an appropriate network of conventional component circuits, as will be readily apparent to those skilled in the art.

This application claims priority of Japanese Application No. 9-084633 filed on Mar. 19, 1997 which is incorporated herein by reference.

It will be apparent to those skilled in the art that numerous additional modifications and variations of the present invention are possible in light of the above teachings. It is therefore to be understood that within the scope of the appended claims, the system and method may be practiced otherwise than as specifically described herein.

What is claimed is:

1. A network facsimile apparatus, comprising:
   an electronic mail receiver for receiving electronic mail via a local area network and the Internet;
   a facsimile transmitter for transmitting facsimile data including facsimile image information and a facsimile data file through facsimile communications procedures via a public switched telephone network;
   a mail analyzer for determining whether electronic mail received through said electronic mail receiver is relay transmission mail and for determining whether received relay transmission mail includes text contents by examining header information indicated in said received relay transmission mail when said received electronic mail is determined to be relay transmission mail and for reading a telephone number of a destination facsimile machine from said received relay transmission mail; and
   a relay transmission controller for converting text contents included in said received electronic mail into facsimile image information in accordance with an encoding method indicated in said header information when said mail analyzer determines that said received electronic mail is relay transmission mail and it is determined that the received relay transmission mail includes text contents and for converting non-text contents included in said received electronic mail into a facsimile transfer data file when said mail analyzer determines that said received electronic mail is relay transmission mail and determines that the received relay transmission mail includes non-text contents and for transmitting at least one of said facsimile image information and said facsimile transfer data file through said facsimile transmitter to said destination facsimile machine having said telephone number read by said mail analyzer from said received relay transmission mail.

2. The network facsimile apparatus according to claim 1, wherein said relay transmission controller copies said header information indicated in said received relay transmission mail and pastes the copied information to text contents to be converted into facsimile image information when said relay transmission mail includes at least one text contents part and generates individual facsimile image information having text contents including said header information when said relay transmission mail includes only non-text contents.

3. A network facsimile apparatus, comprising:
   an electronic mail receiver for receiving electronic mail via a local area network and the Internet;
   a facsimile transmitter for transmitting facsimile data including facsimile image information and a facsimile data file through facsimile communications procedures via a public switched telephone network;
   a mail analyzer for determining whether electronic mail received through said electronic mail receiver is a multi-part relay transmission mail and for determining whether each part of received multi-part relay transmission mail includes text contents by examining header information indicated in said received multi-part relay transmission mail when said received electronic mail is determined to be a multi-part relay transmission mail and for reading a telephone number of a destination facsimile machine from said received relay transmission mail; and
   a relay transmission controller for converting each text contents part of said received electronic mail into facsimile image information in accordance with an encoding method indicated in said header information when said mail analyzer determines that said received electronic mail is a multi-part relay transmission mail and it is determined that the multi-part relay transmission mail includes at least one text contents part and for converting non-text contents parts of said received electronic mail into a facsimile transfer data file when said mail analyzer determines that said received electronic mail is a multi-part relay transmission mail and it is determined that the multi-part relay transmission mail includes at least one non-text contents part and for transmitting said facsimile image information and said facsimile transfer data files in one transmission session through said facsimile transmitter to said destination facsimile machine having said telephone number read by said mail analyzer from said received relay transmission mail.

4. The network facsimile apparatus according to claim 3, wherein said relay transmission controller copies said header information indicated in said received relay transmission mail and pastes the copied information to text contents to be converted into facsimile image information when said relay transmission mail includes at least one text contents part and generates individual facsimile image information having text contents including said header information when said relay transmission mail includes only non-text contents.

5. The network facsimile apparatus according to claim 3, wherein said relay transmission controller copies common header information indicated in said received multi-part relay transmission mail and pastes the copied common header information to each header of text contents parts to be converted into facsimile image information when said multi-part relay transmission mail includes at least one text contents part and of non-text contents parts to be converted into facsimile transfer data files when said multi-part relay transmission mail includes at least one non-text contents part.

6. The network facsimile apparatus according to claim 5, wherein said relay transmission controller copies common header information indicated in said received multi-part relay transmission mail and pastes the copied common header information only to a header of a first text contents part to be converted into facsimile image information when said multi-part relay transmission mail includes at least one text contents part.

7. A network facsimile apparatus, comprising:
an electronic mail receiver for receiving electronic mail via a local area network and the Internet;
a facsimile transmitter for transmitting facsimile data including facsimile image information and a facsimile data file through facsimile communications procedures via a public switched telephone network;
a mail analyzer for determining whether electronic mail received through said electronic mail receiver is a multi-part relay transmission mail and for determining whether each part of the received multi-part relay transmission mail includes text contents by examining header information indicated in said received multi-part relay transmission mail when said received electronic mail is determined to be a multi-part relay transmission mail and for reading a telephone number of a destination facsimile machine from said received relay transmission mail; and
a relay transmission controller for converting text contents included in said received electronic mail into facsimile image information in accordance with an encoding method indicated in said header information when said mail analyzer determines that said received electronic mail is a non-multi-part relay transmission mail and it is determined that the received non-multi-part relay transmission mail includes text contents and for converting non-text contents of said received electronic mail into a facsimile transfer data file when said mail analyzer determines that said received electronic mail is a non-multi-part relay transmission mail and determines that the received non-multi-part relay transmission mail includes non-text contents and for transmitting at least one of said facsimile image information and said facsimile transfer data file through said facsimile transmitter to said destination facsimile machine having said telephone number read by said mail analyzer from said received non-multi-part relay transmission mail, and for converting each text contents part of said received electronic mail into facsimile image information in accordance with an encoding method indicated in said header information when said mail analyzer determines that said received electronic mail is a multi-part relay transmission mail and it is determined that the received multi-part relay transmission mail includes at least one text contents part and for converting non-text contents parts of said received electronic mail into a facsimile transfer data file when said mail analyzer determines that said received electronic mail is a multi-part relay transmission mail and determines that the received multi-part relay transmission mail includes at least one non-text contents part and for transmitting said facsimile image information and said facsimile transfer data files in one transmission session through said facsimile transmitter to said destination facsimile machine having said telephone number read by said mail analyzer from said received relay transmission mail.

8. A network facsimile apparatus, comprising:
an electronic mail receiver for receiving electronic mail via a local area network and the Internet;
a facsimile transmitter for transmitting facsimile data including facsimile image information and a facsimile data file through facsimile communications procedures including an error correction mode procedure via a public switched telephone network;
a mail analyzer for determining whether electronic mail received through said electronic mail receiver is a multi-part relay transmission mail and for determining whether each part of received multi-part relay transmission mail includes text contents by examining header information indicated in said received multi-part relay transmission mail when said received electronic mail is determined to be a multi-part relay transmission mail and reading a telephone number of a destination facsimile machine from said received relay transmission mail; and
a relay transmission controller for converting the text contents parts of said received electronic mail into continuous facsimile image information in accordance with an encoding method indicated in said header information when said mail analyzer determines that said received electronic mail is a multi-part relay transmission mail and it is determined that the received multi-part relay transmission mail includes at least one text contents part and for converting all of non-text contents parts into a facsimile transfer data file when said mail analyzer determines that said received electronic mail is a multi-part relay transmission mail and determines that the received multi-part relay transmission mail includes at least one non-text contents part and for transmitting at least one of said continuous facsimile image information and said facsimile transfer data file in one transmission session in a successive page format through said error correction mode procedure through said facsimile transmitter to said destination facsimile machine having said telephone number read by said mail analyzer from said received relay transmission mail.

9. A network facsimile apparatus, comprising:
an electronic mail receiver for receiving electronic mail via a local area network and the Internet;
a facsimile transmitter for transmitting facsimile data including facsimile image information and a facsimile data file through facsimile communications procedures including an error correction mode procedure via a public switched telephone network;
a mail analyzer for determining whether electronic mail received through said electronic mail receiver is a multi-part relay transmission mail and for determining whether each part of a received multi-part relay transmission mail includes text contents by examining header information indicated in said received multi-part relay transmission mail when said received electronic mail is determined to be a multi-part relay transmission mail and for reading a telephone number of a destination facsimile machine from said received relay transmission mail; and
a relay transmission controller for converting text contents included in said received electronic mail into facsimile image information in accordance with an encoding method indicated in said header information when said mail analyzer determines that said received electronic mail is a non-multi-part relay transmission mail and it is determined that the received relay transmission mail includes text contents and for converting non-text contents included in said received electronic mail into a facsimile transfer data file when said mail analyzer determines that said received electronic mail is a non-multi-part relay transmission mail and determines that the received relay transmission mail includes non-text contents and for transmitting at least one of said facsimile image information and said facsimile transfer data file through said facsimile transmitter to said destination facsimile machine having said telephone number read by said mail analyzer from said received non-multi-part relay transmission mail, and for converting the text contents parts of said received electronic mail into continuous facsimile image information in accordance with an encoding method indicated in said header information when said mail analyzer determines that said received electronic mail is a multi-part relay transmission mail and it is determined that the received multi-part relay transmission mail includes at least one text contents part and the non-text contents parts into a facsimile transfer data file when said mail analyzer determines that said received electronic mail is a multi-part relay transmission mail and determines that the received multi-part relay transmission mail includes at least one non-text contents part and for transmitting said continuous facsimile image information and said facsimile transfer data file in one transmission session in a successive page format through said error correction mode procedure through said facsimile transmitter to said destination facsimile machine having said telephone number read by said mail analyzer from said received relay transmission mail.

10. A method of electronic mail relay transmission, comprising:
receiving electronic mail via a local area network and the Internet;
transmitting facsimile data including facsimile image information and a facsimile data file through facsimile communications procedures via a public switched telephone network;
determining whether electronic mail received in said receiving step is a relay transmission mail and determining whether received relay transmission mail includes text contents by examining header information indicated in said received relay transmission mail when said received electronic mail is determined to be relay transmission mail;
reading a telephone number of a destination facsimile machine from said received relay transmission mail;
converting text contents included in said received electronic mail into facsimile image information in accordance with an encoding method indicated in said header information when said determining step determines that said received electronic mail is a relay transmission mail and it is determined that the received relay transmission mail includes text contents and converting non-text contents included in said received electronic mail into a facsimile transfer data file when the determining step determines that said received electronic mail is a relay transmission mail and determines that the received relay transmission mail includes non-text contents; and
sending at least one of said facsimile image information and said facsimile transfer data through said transmitting step to said destination facsimile machine having said telephone number read in said reading step from said received relay transmission mail.

11. The method of electronic mail relay transmission according to claim 10, further comprising the steps of copying said header information indicated in said received relay transmission mail and pasting the copied information to text contents to be converted into facsimile image information when said relay transmission mail includes at least one text contents part and generating individual facsimile image information having text contents including said header information when said relay transmission mail includes only non-text contents.

12. A method of electronic mail relay transmission, comprising:
receiving electronic mail via a local area network and the Internet;
transmitting facsimile data including facsimile image information and a facsimile data file through facsimile communications procedures via a public switched telephone network;
determining whether electronic mail received in the receiving step is a multi-part relay transmission mail and determining whether each part of a received multi-part relay transmission mail includes text contents by examining header information indicated in said received multi-part relay transmission mail when said received electronic mail is determined to be a multi-part relay transmission mail;
reading a telephone number of a destination facsimile machine from said received relay transmission mail;
converting each text contents part of said received electronic mail into facsimile image information in accordance with an encoding method indicated in said header information when said determining step determines that said received electronic mail is a multi-part relay transmission mail and it is determined that the received multi-part relay transmission mail includes at least one text contents part and converting non-text contents parts of said received electronic mail into a facsimile transfer data file when said determining step determines that said received electronic mail is a multi-part relay transmission mail and determines that the received multi-part relay transmission mail includes at least one non-text contents part; and
sending said facsimile image information and said facsimile transfer data files in one transmission session through said transmitting step to said destination facsimile machine having said telephone number read in said reading step from said received relay transmission mail.

13. The method of electronic mail relay transmission according to claim 12, further comprising the steps of copying said header information indicated in said received relay transmission mail and pasting the copied information to text contents to be converted into facsimile image information when said relay transmission mail includes at least one text contents part and generating individual facsimile image information having text contents including said header information when said relay transmission mail includes only non-text contents.

14. The method of electronic mail relay transmission according to claim 12, further comprising the steps of coping common header information indicated in said received multi-part relay transmission mail and pasting the copied information to each header of text contents parts to be converted into facsimile image information when said multi-part relay transmission mail includes at least one text part and of non-text contents parts to be converted into facsimile transfer data files when said multi-part relay transmission mail includes at least one non-text contents part.

15. The method of electronic mail relay transmission according to claim 14, comprising the steps of coping common header information indicated in said received multi-part relay transmission mail and pasting the copied common header information only to a headed of a first contents part to be converted into facsimile image information when said multi-part relay transmission mail includes at least one text contents part.

16. A method of electronic mail relay transmission, comprising:

receiving electronic mail via a local area network and the Internet;

transmitting facsimile data including facsimile image information and a facsimile data file through facsimile communications procedures via a public switched telephone network;

determining whether electronic mail received in said receiving step is a multi-part relay transmission mail and determining whether each part of a received multi-part relay transmission mail includes text contents by examining header information indicated in said received multipart relay transmission mail when said received electronic mail is determined to be a multi-part relay transmission mail;

reading a telephone number of a destination facsimile machine from said received relay transmission mail;

first step of converting text contents included in said received electronic mail into facsimile image information in accordance with an encoding method indicated in said header information when said determining step determines that said received electronic mail is a non-multi-part relay transmission mail and it is determined that the received electronic mail includes text contents and converting non-text contents included in said received electronic mail into a facsimile transfer data file when said determining step determines that said received electronic mail is a non-multi-part relay transmission mail and determines that the received electronic mail includes non-text contents;

first step of sending at least one of said facsimile image information and said facsimile transfer data file which has undergone said first step of converting, through said transmitting step to said destination facsimile machine having said telephone number read in said reading step from said received non-multi-part relay transmission mail;

second step of converting each text contents part of said received electronic mail into facsimile image information in accordance with an encoding method indicated in said header information when said determining step determines that said received electronic mail is a multi-part relay transmission mail and determines that the multi-part relay transmission mail includes at least one text contents part and converting non-text contents parts into a facsimile transfer data file when said determining step determines that said received electronic mail is a multi-part relay transmission mail and determines that the multi-part relay transmission mail includes at least one non-text contents part; and second step of sending said facsimile image information and said facsimile transfer data files which have undergone said step of second step of converting, in one transmission session through said transmitting step to said destination facsimile machine having said telephone number read in said reading step from said received relay transmission mail.

17. A method of electronic mail relay transmission, comprising the steps of:

receiving electronic mail via a local area network and the Internet;

transmitting facsimile data including facsimile image information and a facsimile data file through facsimile communications procedures including an error correction mode procedure via a public switched telephone network;

determining whether electronic mail received in said receiving step is a multi-part relay transmission mail and determining whether each part of a received multi-part relay transmission mail includes text contents by examining header information indicated in said received multi-part relay transmission mail when said received electronic mail is determined to be a multi-part relay transmission mail;

reading a telephone number of a destination facsimile machine from said received relay transmission mail;

converting the text contents parts of said received electronic mail into continuous facsimile image information in accordance with an encoding method indicated in said header information when said determining step determines that said received electronic mail is a multi-part relay transmission mail and it is determined that the received multi-part relay transmission mail includes at least one text contents part and converting the non-text contents parts into a facsimile transfer data file when said determining step determines that said received electronic mail is a multi-part relay transmission mail and determines that the received multi-part relay transmission mail includes at least one non-text contents part; and sending said continuous facsimile image information and said facsimile transfer data file in one transmission session in a successive page format through said error correction mode procedure in said transmitting step to said destination facsimile machine having said telephone number read in said reading step from said received relay transmission mail.

18. A method of electronic mail relay transmission, comprising the steps of:

receiving electronic mail via a local area network and the Internet;

transmitting facsimile data including facsimile image information and a facsimile data file through facsimile communications procedures including an error correction mode procedure via a public switched telephone network;

determining whether electronic mail received in said receiving step is a multi-part relay transmission mail and determining whether each part of a received multi-part relay transmission mail includes text contents by examining header information indicated in said received multi-part relay transmission mail when said received electronic mail is determined to be a multi-part relay transmission mail;

reading a telephone number of a destination facsimile machine from said received relay transmission mail;

first step of converting text contents included in said received electronic mail into facsimile image information in accordance with an encoding method indicated in said header information when said determining step determines that said received electronic mail is a non-multi-part relay transmission mail and it is determined that the received electronic mail includes text contents and converting non-text contents included in said received electronic mail into a facsimile transfer data file when said determining step determines that said received electronic mail is a non-multi-part relay transmission mail and determines that the received electronic mail includes non-text contents;

first step of sending at least one of said facsimile image information and said facsimile transfer data file which has undergone said first step of converting, through said transmitting step to said destination facsimile machine having said telephone number read in said reading step from said received non-multi-part relay transmission mail;

second step of converting the text contents parts of said received electronic mail into continuous facsimile image information in accordance with an encoding method indicated in said header information when said determining step determines that said received electronic mail is a multi-part relay transmission mail and determines that the received multi-part relay transmission mail includes at least one text contents part and converting the non-text contents parts into a facsimile transfer data file when said determining step determines that said received electronic mail is a multi-part relay transmission mail an determines that the received multi-part relay transmission mail includes at least one non-text contents part; and second step of sending said continuous facsimile image information and said facsimile transfer data file which have undergone said second step of converting, in one transmission session in a successive page format through said error correction mode in said transmission step to said destination facsimile machine having said telephone number read in said reading step from said received relay transmission mail.

\* \* \* \* \*